US010721595B2

(12) United States Patent
Snyder et al.

(10) Patent No.: US 10,721,595 B2
(45) Date of Patent: Jul. 21, 2020

(54) LOCATION-BASED VOIP FUNCTIONS IN A WIRELESS NETWORK

(71) Applicant: Cisco Technology, Inc., San Jose, CA (US)

(72) Inventors: Ian M. Snyder, San Francisco, CA (US); Morgan Teachworth, Campbell, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/810,797

(22) Filed: Nov. 13, 2017

(65) Prior Publication Data

US 2018/0084389 A1     Mar. 22, 2018

Related U.S. Application Data

(63) Continuation of application No. 15/468,964, filed on Mar. 24, 2017, now Pat. No. 9,820,105, which is a
(Continued)

(51) Int. Cl.
*H04W 4/029* (2018.01)
*H04W 4/021* (2018.01)
(Continued)

(52) U.S. Cl.
CPC ............... *H04W 4/029* (2018.02); *G01S 5/02* (2013.01); *G01S 5/0252* (2013.01);
(Continued)

(58) Field of Classification Search
CPC ......... H04W 4/02; H04W 40/20; H04W 4/04; H04W 4/023; H04W 84/12;
(Continued)

(56) References Cited

U.S. PATENT DOCUMENTS 5,642,303 A     6/1997 Small et al.
8,010,079 B2    8/2011 Mia
(Continued)

OTHER PUBLICATIONS

Savvides et al., "Dynamic Fine-Grained Localization in Ad-Hoc Networks of Sensors", Proceeding MobiCom '01 Proceedings of the 7th annual international conference on Mobile computing and networking, pp. 166-179, Jul. 2001.
(Continued)

*Primary Examiner* — Nam T Huynh
(74) *Attorney, Agent, or Firm* — Polsinelli PC

(57) ABSTRACT

A wireless network can include one or more nodes distributed throughout a physical environment. The locations of client devices within the wireless network can be determined based on observing measurements of wireless signals exchanged between the nodes and the client devices. In some example embodiments, the capability of determining location information of client devices more accurately can be utilized for enhancing Voice over Internet Protocol (VoIP) functions. In an example embodiment, a phone call can be intelligently routed to where the user is located within the wireless network. In another example embodiment, the volume of a VoIP-enabled client device can be adjusted depending on the proximity of other users.

20 Claims, 9 Drawing Sheets

Related U.S. Application Data continuation of application No. 14/973,469, filed on Dec. 17, 2015, now Pat. No. 9,642,167.

(51) Int. Cl.
| | |
|---|---|
| *H04W 8/00* | (2009.01) |
| *H04L 29/06* | (2006.01) |
| *H04W 76/50* | (2018.01) |
| *H04W 4/80* | (2018.01) |
| *G01S 5/02* | (2010.01) |
| *H04W 4/90* | (2018.01) |
| *H04M 1/725* | (2006.01) |
| *H04M 7/00* | (2006.01) |

(52) U.S. Cl.
CPC ...... *H04L 65/1059* (2013.01); *H04L 65/1069* (2013.01); *H04M 1/72569* (2013.01); *H04M 7/006* (2013.01); *H04W 4/021* (2013.01); *H04W 4/80* (2018.02); *H04W 4/90* (2018.02); *H04W 8/005* (2013.01); *H04W 76/50* (2018.02); *H04M 1/72572* (2013.01)

(58) Field of Classification Search
CPC ..... H04W 84/045; H04W 4/16; H04W 4/029; H04W 4/021; H04W 4/80; H04W 4/33; H04W 12/00503; H04M 2242/30; H04M 3/42263; H04M 1/72572; H04M 2250/10; H04M 2203/2094; H04M 2242/14; H04M 3/42348; H04L 67/24; H04L 51/14
See application file for complete search history.

(56) References Cited

U.S. PATENT DOCUMENTS

| | | |
|---|---|---|
| 8,260,320 B2 | 9/2012 | Herz |
| 8,284,748 B2 | 10/2012 | Borghei |
| 8,300,594 B1 | 10/2012 | Bernier et al. |
| 8,396,485 B2 | 3/2013 | Grainger et al. |
| 8,458,184 B2 | 6/2013 | Dorogusker et al. |
| 8,644,301 B2 | 2/2014 | Tamhankar et al. |
| 8,669,902 B2 | 3/2014 | Pandey et al. |
| 8,676,182 B2 | 3/2014 | Bell et al. |
| 8,682,279 B2 | 3/2014 | Rudolf et al. |
| 8,718,644 B2 | 5/2014 | Thomas et al. |
| 8,849,283 B2 | 9/2014 | Rudolf et al. |
| 2004/0203572 A1 | 10/2004 | Aerrabotu et al. |
| 2005/0090225 A1 | 4/2005 | Muehleisen et al. |
| 2006/0030290 A1 | 2/2006 | Rudolf et al. |
| 2007/0037605 A1 | 2/2007 | Logan |
| 2008/0037715 A1 | 2/2008 | Prozeniuk |
| 2008/0233969 A1 | 9/2008 | Mergen |
| 2009/0203370 A1 | 8/2009 | Giles |
| 2009/0298511 A1* | 12/2009 | Paulson ............ H04M 1/72572 455/456.1 |
| 2011/0194553 A1 | 8/2011 | Sahin et al. |
| 2012/0023552 A1 | 1/2012 | Brown et al. |
| 2012/0088476 A1* | 4/2012 | Greenfield ........ H04M 1/72572 455/414.1 |
| 2012/0115512 A1 | 5/2012 | Grainger et al. |
| 2012/0157126 A1 | 6/2012 | Rekimoto |
| 2012/0167207 A1 | 6/2012 | Beckley et al. |
| 2013/0029685 A1 | 1/2013 | Moshfeghi |
| 2013/0039391 A1 | 2/2013 | Skarp |
| 2013/0057435 A1 | 3/2013 | Kim |
| 2013/0115916 A1 | 5/2013 | Herz |
| 2013/0203445 A1 | 8/2013 | Grainger et al. |
| 2013/0273938 A1 | 10/2013 | Ng et al. |
| 2013/0317944 A1 | 11/2013 | Huang et al. |
| 2013/0343198 A1 | 12/2013 | Chhabra et al. |
| 2014/0052508 A1 | 2/2014 | Pandey et al. |
| 2014/0059655 A1 | 2/2014 | Beckley et al. |
| 2014/0087693 A1 | 3/2014 | Walby et al. |
| 2014/0118113 A1 | 5/2014 | Kaushik et al. |
| 2014/0148196 A1 | 5/2014 | Bassan-Eskenazi et al. |
| 2014/0179352 A1 | 6/2014 | Mubeesh Ali et al. |
| 2014/0191868 A1 | 7/2014 | Ortiz et al. |
| 2014/0287767 A1* | 9/2014 | Wohlert .................. H04W 4/04 455/445 |
| 2014/0302869 A1 | 10/2014 | Rosenbaum et al. |
| 2015/0087330 A1 | 3/2015 | Prechner et al. |
| 2015/0256972 A1 | 9/2015 | Markhovsky et al. |
| 2015/0264519 A1 | 9/2015 | Mirzaei et al. |
| 2015/0326704 A1 | 11/2015 | Ko et al. |
| 2015/0362581 A1 | 12/2015 | Friedman et al. |
| 2016/0007315 A1 | 1/2016 | Lundgreen et al. |
| 2016/0044627 A1 | 2/2016 | Aggarwal |
| 2017/0026974 A1* | 1/2017 | Dey ..................... H04W 4/025 |

OTHER PUBLICATIONS

Galvan T. et al., "Wifi bluetooth based combined positioning algorithm," International Meeting of Electrical Engineering Research ENIINVIE 2012, Procedia Engineering 35 ( 2012 ), pp. 101-108.

Carter, Steve; "E911 VOIP Essentials for Enterprise Deployments," XO Communications, LLC, 2012.

Cisco Systems, Inc., "Wi-Fi Location-Based Services 4.1 Design Guide," May 20, 2008.

* cited by examiner

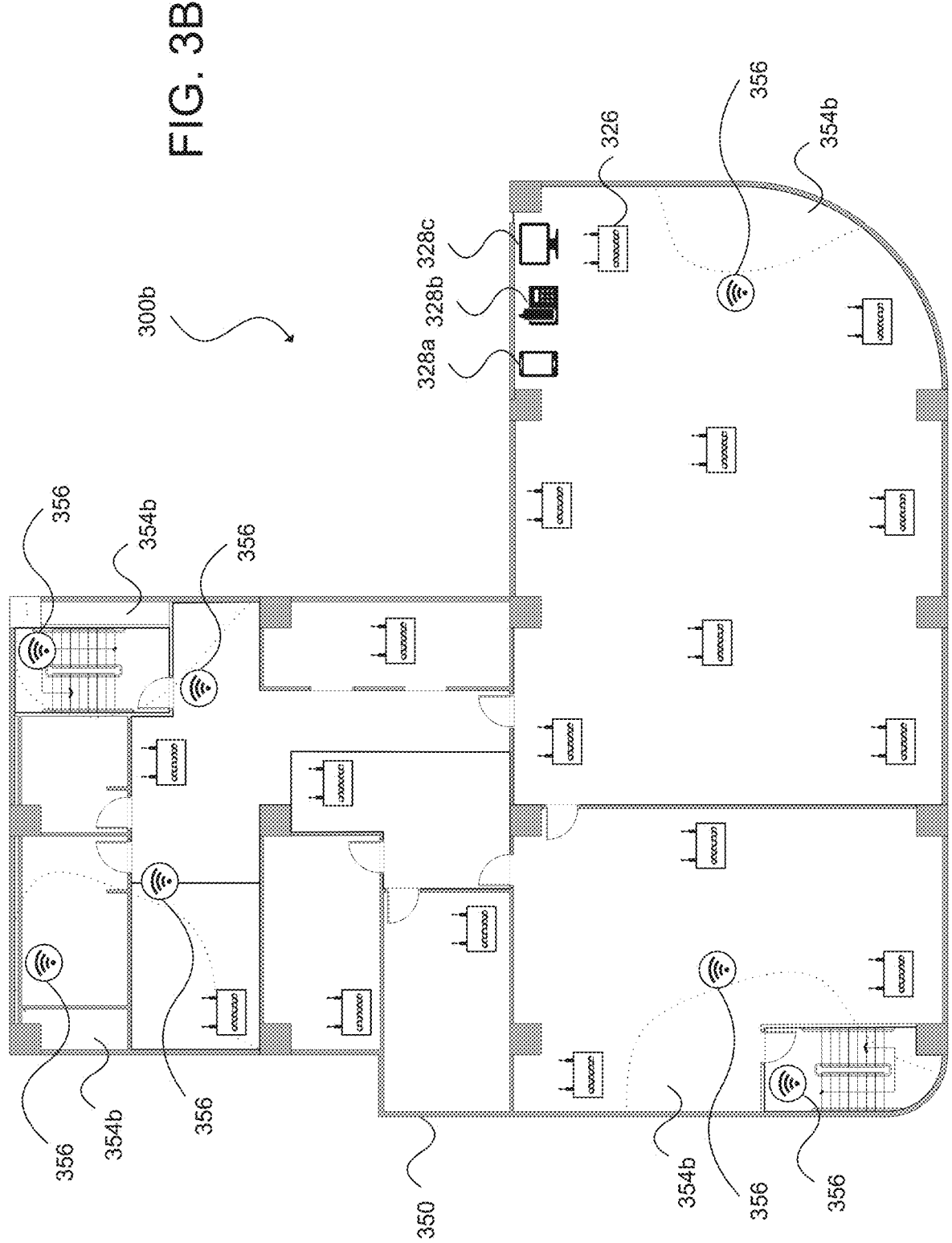

LOCATION-BASED VOIP FUNCTIONS IN A WIRELESS NETWORK

RELATED APPLICATIONS

This application is a continuation of U.S. patent application Ser. No. 15/468,964 filed on Mar. 24, 2017, which in turn is a continuation of U.S. patent application Ser. No. 14/973,469 filed on Dec. 17, 2015, which is now U.S. Pat. No. 9,642,167, the contents of which are incorporated by reference in their entireties.

TECHNICAL FIELD

The subject matter of this disclosure relates in general to the field of computer networks, and more specifically to providing location-based functions for client devices in a wireless network.

BACKGROUND

A wireless network may include a gateway that can connect to a wide area network (WAN), such as the Internet; wireless access points (APs) that may communicate with the gateway and provide network connectivity for client devices; and the client devices, such as a server, desktop computer or workstation, laptop, tablet, desk phone, smartphone, wearable device, or other device capable of electronically transmitting and receiving audio, video, and/or other data over a distance. An advantage of a wireless network may be convenience. The wireless network can be implemented with little to no physical infrastructure, such as extensive and complex cabling, racking, high density cooling, etc. Once a connection to the WAN is established, the APs may be capable of providing network access to the client devices within a geographic area that may be limited only by the distribution of the APs.

Another advantage of a wireless network may be the capability to approximate a physical location of a client device, such as by using received signal strength measurements as a proxy for distance to one or more APs whose locations are known. For example, the location of the client device can be determined from a strength, time of flight, time difference of arrival, or angle of arrival of signals received at APs using techniques such as lateration, angulation, pattern matching, or fingerprinting, among others.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only examples of the disclosure and are not therefore to be considered to be limiting of its scope, the principles herein are described and explained with additional specificity and detail through the use of the accompanying drawings in which:

FIGS. 3A and 3B illustrate examples of environments in accordance with example embodiments;

DESCRIPTION OF EXAMPLE EMBODIMENTS

Figure 1:
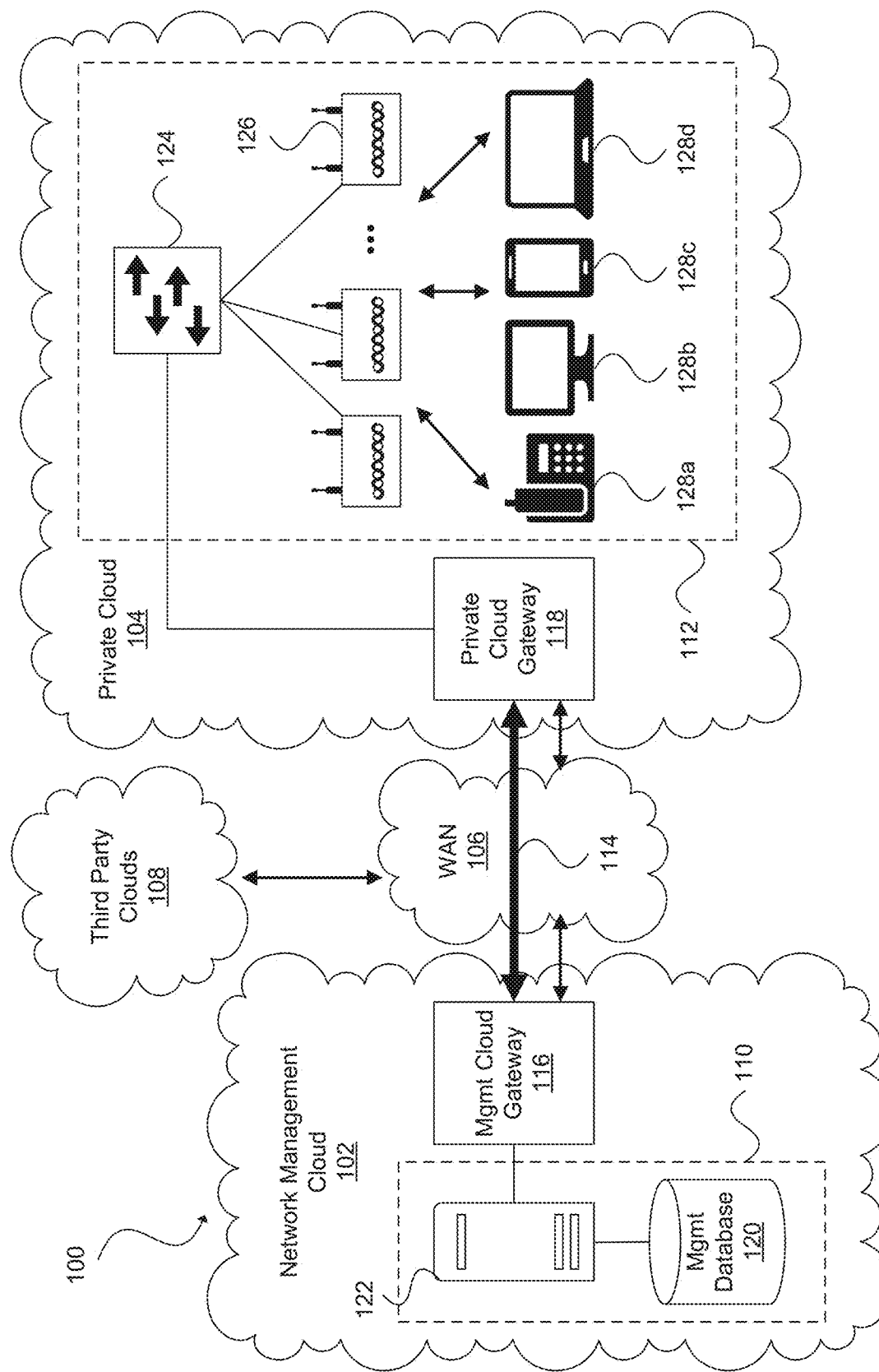
FIG. 1 illustrates an example network environment in accordance with an example embodiment.

The detailed description set forth below is intended as a description of various configurations of example embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

A network controller located remotely from a wireless network of an enterprise network can be used to manage the wireless network. The wireless network can include one or more nodes, such as wireless access points and/or Bluetooth Low Energy (BLE) beacons, distributed throughout a physical environment. The network controller can be configured to determine the physical locations of each client device, such as a server, desktop computer, laptop, tablet, desk phone, smartphone, wearable device, or other electronic device, within the wireless network. For example, the network controller can cause the nodes of the wireless network and a client device to exchange wireless signals to capture measurements relating to a time of arrival, time difference of arrival, and/or a received signal strength. The network controller can apply techniques, such as lateration, angulation, pattern matching, fingerprinting, and/or other methods for determining location, to the captured measurements to determine the positions of the client devices in the wireless network.

In some example embodiments, the network controller can function as a location engine to enhance existing features or add new features for Voice over Internet Protocol (VoIP) functionality implemented in the enterprise network. In an example embodiment, the enterprise network can receive a phone call intended for a phone number or network address (e.g., uniform resource identifier (URI), IP address, MAC address, etc.) associated with a first VoIP-enabled client device. The enterprise network can intelligently route the phone call based on the location of a user associated with the first VoIP-enabled client device. For example, if the user is proximate to the first VoIP-enabled client device, the phone call can be routed to that device. On the other hand, if the user is not proximate to the first VoIP-enabled client device, the enterprise network can determine a second VoIP-enabled client device most proximate to the user and forward the phone call to the second device. In this manner, features such as call forwarding, call pick-up, follow-me, and the like, can be improved based on location information of a user or a client device associated with the user.

In another example embodiment, the enterprise network can receive, via enterprise infrastructure, an emergency phone call from a VoIP-enabled client device associated with a user. The enterprise network can determine the location of the user making the emergency phone call and provide the location information to emergency phone call dispatchers and emergency response personnel for handling the emergency. In another example embodiment, the enterprise network can determine whether there are other users within the vicinity of the user. If the user is proximate to other users, a volume of a VoIP-enabled client device associated with the user can be muted or lowered so as not to disturb those other users when a phone call, public address message, intercom message, or other audible communication is sent to VoIP-enabled client device. Other functions and advantages are described and suggested below in accordance with the various example embodiments.

DETAILED DESCRIPTION

A computer network is a geographically distributed collection of nodes interconnected by communication links and segments for transporting data between endpoints, such as personal computers and workstations. Many types of networks are available, with the types ranging from local area networks (LANs) and WANs to overlay networks and software-defined networks (SDNs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective size of each network.

Overlay networks generally allow virtual networks to be created and layered over a physical network infrastructure. Overlay network protocols, such as virtual extensible LAN (VXLAN), network virtualization using generic routing encapsulation (NVGRE), network virtualization Overlays (NVO3), and stateless transport tunneling (STT), provide a traffic encapsulation scheme which allows network traffic to be carried across L2 and L3 networks over a logical tunnel. Such logical tunnels can be originated and terminated through virtual tunnel end points (VTEPs).

Overlay networks can also include virtual local segments, such as VXLAN segments in a VXLAN overlay network, which can include virtual L2 and/or L3 overlay networks over which virtual machines (VMs) communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Cloud computing can also be provided in a network to provide computing services using shared resources. Cloud computing can generally include Internet-based computing in which computing resources are dynamically provisioned and allocated to client or user computers or other devices on-demand, from a collection of resources available via the network or the cloud. Cloud computing resources can include any type of infrastructure resource, such as a computing, storage, and/or networking instance. For example, infrastructure resources may include network devices (firewalls, deep packet inspectors, traffic monitors, load balancers, etc.), compute/processing devices (servers, CPUs, GPUs, random access memory, caches, etc.), and storage devices (e.g., network attached storages, storage area network devices, hard disk drives, solid-state devices, etc.). Cloud computing resources can also include a combination of infrastructure resources to provide users higher-level services or applications, such as a database service, software development platform, content delivery network (CDN), enterprise email system, collaboration tool (e.g., WebEx® from Cisco®, Inc. of San Jose, Calif.), customer relationship management (CRM) software, network management system (e.g., Meraki® platform from Cisco®), etc.

FIG. 1 illustrates an example of a network environment 100 in accordance with an example embodiment. It should be understood that, for the network environment 100 and any environment discussed herein, there can be additional or fewer nodes, devices, links, networks, or components in similar or alternative configurations. Example embodiments with different numbers and/or types of clients, networks, nodes, cloud components, servers, software components, devices, virtual or physical resources, configurations, topologies, services, appliances, deployments, or network devices are also contemplated herein. Further, the network environment 100 can include any number or type of resources, which can be accessed and utilized by clients or tenants. The illustrations and examples provided herein are for clarity and simplicity.

The network environment 100 can include a network management cloud 102; a private cloud 104; a WAN 106 interconnecting the network management cloud 102, the private cloud 104, and third party clouds 108; and the third party clouds 108 for providing various third-party content and services, such as email, media content (e.g., video, music, gaming, etc.), online banking, social networking, etc. The network management cloud 102 can host a network management system 110 for administering a wireless LAN (WLAN) 112 in the private cloud 104. The cloud-hosted network management system 110 may be configured to manage the configuration and operation of various devices in a LAN, such as the WLAN 112, and/or across geographically distributed portions of a VLAN.

A secure connection 114 can be established between the network management cloud 102 and the private cloud 104 via a management cloud gateway 116 in the management cloud and a private cloud gateway 118 in the private cloud. In addition to establishing the secure connection 114, the management cloud gateway 116 and the private cloud gateway 118 can also provide network services, such as routing, firewalling, VPN, load balancing, WAN acceleration, content filtering, etc. In an example embodiment, the management cloud gateway 116 and/or the private cloud gateway 118 can be implemented using Meraki® MX Family security appliances.

The secure connection 114 can be used by devices of the network management system 110 and the WLAN 112 to exchange management data (e.g., configuration, statistical, or monitoring data). The secure connection 114 can be implemented in various ways, such as utilizing VPN or L2 tunneling protocols. In an example embodiment, an open VPN (e.g., OpenVPN) overlay or an IP Security (IPSec) VPN-based L3 network extension can be used to provide the secure connection 114. In another example embodiment, a secure transport layer (i.e., L4) tunnel can be used as the secure connection 114 between the management cloud gateway 116 and the private cloud gateway 118, such as by utilizing Transport Layer Security (TLS), Datagram TLS (DTLS), Secure Socket Layer (SSL), etc., across the WAN 106.

The secure connection 114 may utilize portions of the WAN 106. For example, packets that are transmitted via the secure connection can be marked and/or contain header fields that enable the prioritization of the secure tunnel packets on at least some portions of the WAN 106. In some example embodiments, the prioritization of the secure tunnel packets can include the use of private, dedicated routing paths between the network management system 110 and the WLAN 112 to reduce latency and/or improve reliability.

The cloud-hosted network management system 110 can include a management database 120 and network management server 122. The network management server 122 can manage cloud operations, client communications, service provisioning, network configuration and monitoring, etc. The management database 120 may store configuration information, statistics, monitoring information, and other management data relating to the WLAN 112. In an example embodiment, the cloud-hosted network management system 110 can be implemented using the Meraki® platform.

The private cloud 104 may include a private cloud gateway 118 and the WLAN 112, which can comprise access switch 124, APs 126, and client devices, such as a desk phone 128a, desktop computer 128b, smartphone 128c, and laptop 128d (collectively, client devices 128). As discussed, the client devices 128 can also include servers, tablets, wearable devices, or other devices capable of electronically transmitting and receiving audio, video, and/or other data over a distance. Each of the client devices 128 can include one or more processors, one or more types of memory, a display, and/or other user interface components such as a keyboard, touch screen display, mouse, track-pad, digital camera, and/or any number of peripheral devices or components to add functionality for the client device. The client devices 128 can also be capable of protocol processing, modulation, demodulation, data buffering, power control, routing, switching, clock recovery, amplification, decoding, and/or error control.

The access switch 124 can function as a LAN interface between the private cloud gateway 118 and the APs 126. In an example embodiment, the access switch 124 can be implemented as a physical device or physical devices separate from the private cloud gateway 118, such as one or more Meraki® MS family switches for the access switch 124 and a Meraki® MX Family security appliance for the private cloud gateway 118. In another example embodiment, the access switch 124 may be integrated with the private cloud gateway 118, and the integrated device can be implemented using a Meraki® MX Family security appliance.

The APs 126 can provide network access to the client devices 128 in the WLAN 112. The APs 126 can be configured to communicate and operate in accordance with configuration instructions, software and/or firmware updates, and rules provided by the network management system 110. The network management system 110 and/or the APs 126 may also be capable of estimating a physical location of each client device 128. In an example embodiment, a serving AP 126 connected to a client device 128 for providing network connectivity to the client device can send a measurement request action frame to the client device, which may cause the client device to transmit a broadcast probe request frame. The broadcast probe request frame can be received by any AP 126 within range of the client device 128, including the serving AP. Each AP 126 that receives the broadcast probe request frame may respond by sending a probe response frame to the client device 128. These probe response frames may be in accordance with the IEEE 802.11 standard, and can include signal strength information representing the strength that each AP 126 measured for the broadcast probe request frame that it received from the client device 128. The client device 128 may then bundle all of the probe response frames together into a measurement report action frame that can be sent to one or more of the APs 126 or the network management system 110. Upon receiving the measurement report action frame, one or more of the APs 126 or the network management system 110 can evaluate the probe response frames and determine the location of the client device 128 based on information contained in each of the probe response frames representing the signal strength between the client device 128 and each of the APs. Alternatively, one or more of the APs 126 can forward the signal strength information to another computing device or system, such as another one or more of the APs 126 and/or the network management system 110. In an example embodiment, the APs 126 can be implemented using Meraki® MR Family APs. In other example embodiments, other wireless technologies can be used, such as Bluetooth, ZigBee, Wireless Universal Serial Bus (USB) or ultra-wide band (UWB), or other radio frequency (RF), infrared (IR), ultrasonic, or other wireless technology.

Figure 2:
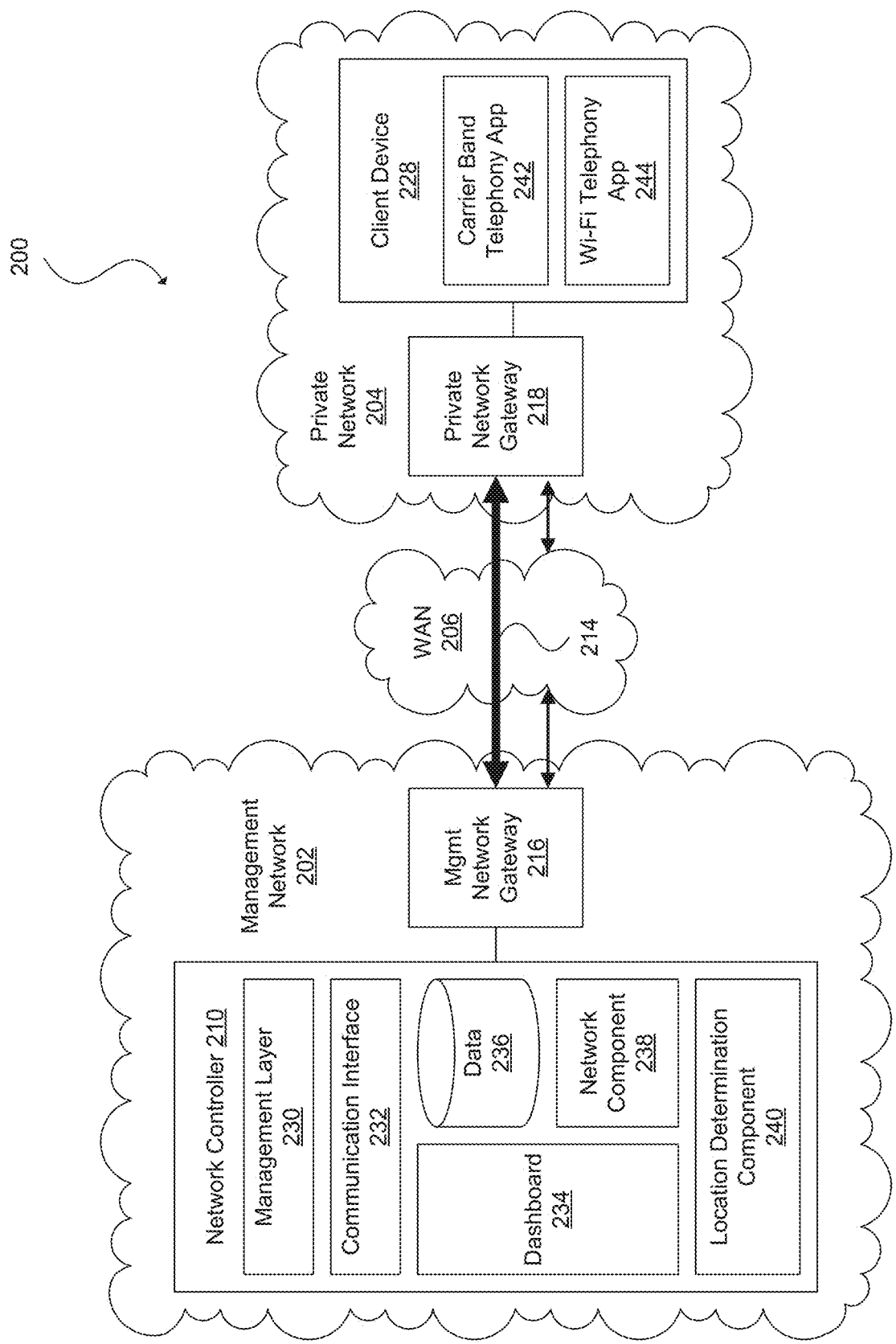
FIG. 2 illustrates an example network environment in accordance with an example embodiment.

FIG. 2 illustrates an example network environment 200 in accordance with an example embodiment. The network environment 200 can represent a simplified configuration of the network environment 100 of FIG. 1. The network environment 200 can include a management network 202 that hosts a network controller 210 and a management network gateway 216. The network controller 210 can be connected to the management network gateway 216 to provide connectivity to a WAN 206, such as the Internet. The network environment 200 can also include a private network 204 that encompasses a client device 228 and a private network gateway 218. The client device 228 may be connected to the private network gateway 218 to provide the client device access to the WAN 206.

A secure connection 214 can be established between the management network gateway 216 and the private network gateway 218 through the WAN 206 to enable the network controller 210 and the client device 228 to exchange management traffic. That is, the management data may flow between the management network 202 and the private network 204 over the secure connection 214. User data, however, does not flow through the management network 202 and can instead flow to its destination in the private network 204 or across the WAN 206 to third party networks, such as third party clouds 108 of FIG. 1.

The network controller 210, remotely hosted in the management network 202, can serve as a network management system for managing and controlling elements of the management network and the private network 204, including the private network gateway and/or client device 228. For example, the network controller 210 can manage various cloud services such as provisioning cloud resources in the management network 202; configuring and updating the cloud resources; monitoring the cloud resources; implementing high availability and failover for the cloud resources; enforcing security and compliance for the cloud resources; etc. The network controller 210 can also send network data to and receive the network data from the client device 228 to facilitate configuration of the client device 228; monitor the private network 204 and status information of elements of the private network, such as the secure connection 214, the private network gateway 218, access switches (e.g., access switch 124 of FIG. 1), APs (e.g., APs 126 of FIG. 1), etc.; and administer the private network 204 and the elements of the private network.

The network controller 210 can include several components or modules, such as a management layer 230, communication interface 232, dashboard 234, data 236, network component 238, and location determination component 240. These modules may be implemented as hardware and/or software components. Although FIG. 2 illustrates an example configuration of the various components of the network controller 210, those of skill in the art will understand that the components of network controller 210 or any device described herein can be configured in a number of different ways and can include any other type and number of components. For example, the management layer 230 and the network component 238 can belong to one software module or multiple separate modules. Other modules can also be combined into fewer components and/or further divided into more components.

The management layer 230 can include logic to perform management operations. For example, the management layer 230 can include logic to allow the various components of the network controller 210 to interface and work together. The management layer 230 can also include logic, functions, software, and procedures to allow the network controller 210 to perform monitoring, management, control, and administration of other devices, the client device 228, applications in the private network 204, services provided to the client device 228, or any other component or procedure. The management layer 230 can include logic to operate the network controller 210 and perform particular services configured on the network controller 210. The management layer 230 may also initiate, enable, or launch other instances in the network controller 210. In an example embodiment, the management layer 230 can also provide authentication and security services for the management network 202, network controller 210, private network 204, client device 228, and/or any other device or component. Further, the management layer 230 can manage nodes, resources, VMs, settings, policies, protocols, communications, etc.

The communication interface 232 may allow the network controller 210 to communicate with the client device 228, as well as any other device or network. The communication interface 232 can be a network interface card (NIC), and can include wired and/or wireless capabilities. The communication interface 232 may allow the network controller 210 to send and receive data from other devices and networks. The network controller 210 can include multiple communications interfaces for redundancy or failover. For example, the network controller 210 can include dual NICs for connection redundancy.

The dashboard 234 can provide a frontend that clients can utilize to access or consume cloud services. For instance, the dashboard 234 can provide a web-based frontend where clients can configure client devices or private networks that are cloud-managed, provide user preferences, specify policies, enter data, upload statistics, configure interactions or operations, etc. The dashboard 234 may also provide visibility information, such as views of the private network 204 or the client device 228. For example, the dashboard 234 can provide a view of the status or conditions of the private network 204, the operations taking place, services, performance, a topology or layout, specific network devices, protocols implemented, running processes, errors, notifications, alerts, network structure, ongoing communications, data analysis, etc.

In an example embodiment, the dashboard 234 can provide a graphical user interface (GUI) for a user to monitor the private network 204, devices, statistics, errors, notifications, etc., and make modifications or setting changes through the GUI. The GUI can depict charts, lists, tables, maps, topologies, symbols, structures, or any graphical object or element. In addition, the GUI can use color, font, shapes, or any other characteristics to depict scores, alerts, or conditions. In an example embodiment, the dashboard 234 can also handle user or client requests. For instance, a user or the client device 228 can enter a service request through the dashboard 234.

The data 236 can include any data or information, such as management data, statistics, settings, preferences, profile data, logs, notifications, attributes, configuration parameters, client information, network information, etc. For example, the network controller 210 can collect network statistics from the client device 228 and store the statistics as part of the data 236. The data 236 may also include performance and/or configuration information, and the network controller 210 can use the data 236 to perform management or service operations for the client device 228. The data 236 may be stored on a storage or memory device on the network controller 210, a separate storage device connected to the network controller 210, or a remote storage device in communication with the network controller 210.

The network component 238 can perform networking calculations, such as network addressing, or networking service or operations, such as auto VPN configuration or traffic routing. The network component 238 may also perform filtering functions, switching functions, failover functions, high availability functions, network or device deployment functions, resource allocation functions, messaging functions, traffic analysis functions, port configuration functions, mapping functions, packet manipulation functions, path calculation functions, loop detection, cost calculation, error detection, or otherwise manipulate data or network devices. In an example embodiment, the network component 238 can handle networking requests from other networks or devices and establish links between devices. In another example embodiment, the network component 238 can perform queueing, messaging, or protocol operations.

The location determination component 240 can be used to determine a location of each client device 228 in the private network 204. Various approaches can be utilized to determine the location of the client device 228, including a cell-based, lateration-based, angulation-base, pattern-matching-based, or fingerprinting-based techniques. A cell-based technique can include the cell of origin approach, wherein the client device 228 can be tracked based on the cell (or receiving device, e.g., AP 126 of FIG. 1) to which the client device associates. Another cell-based technique to estimate the location of the client device 228 can include a nearest cell approach. In the nearest cell technique, the client device 228 may obtain received signal strength indications (RSSIs) from each cell within its vicinity, and the client device can be determined to be located within the cell having the highest RSSI. An advantage of cell-based approaches can be ease of implementation and fast performance. However, cell-based approaches may only be capable of providing location at a very coarse granularity. Further, client devices may not necessarily be associated to cells that are in closest physical proximity to the devices, such as when the client devices are located in a multi-story structure where there may be considerable floor-to-floor cell overlap.

Lateration-based or distance-based approaches for determining the location of the client device 228 can include techniques that utilize time of arrival (ToA), time difference of arrival (TDoa), or received signal strength (RSS). A ToA system can be based on the measurement of the arrival time of a signal transmitted from a client device to each receiving device (e.g., AP). As signals can travel with a known velocity (e.g., approximately the speed of light or ~300 meters per microsecond), the distance between the client device 228 and each receiving device can be determined from the elapsed propagation time of the signal traveling between them. From knowledge of both propagation speed and measured time, it may be possible to calculate the distance between the client device 228 and the receiving device. With the distance used as a radius, a circular representation of the area around the receiving device can be constructed for which the location of the client device 228 is highly probable. ToA information from two receiving devices can resolve a client device location to two equally probable points. ToA tri-lateration can make use of three receiving devices and multi-lateration can make use of four or more receiving devices to allow the client device location to be resolved with improved accuracy. ToA techniques may be capable of resolving location in two-dimensional as well as three-dimensional planes. For instance, three-dimensional resolution can be performed by constructing spherical models instead of circular models. A drawback of the ToA approach may be the requirement for precise time synchronization of all of the devices, especially the client device. Given the high propagation speeds, very small discrepancies in time synchronization can result in very large errors in location accuracy.

TDoA techniques can use relative time measurements at each receiving device in place of absolute time measurements. Thus, TDoA may not require the use of a synchronized time source at the point of transmission (i.e., the client device 228) in order to resolve timestamps and determine location. With TDoA, a transmission with an unknown starting time can be received at various receiving devices, with only the receivers requiring time synchronization. TDoA implementations can be rooted upon a mathematical concept known as hyperbolic lateration. In this approach, at least three time-synchronized receiving devices may be required. For example, the client devices 228 can transmit a message to receiving devices A and B (e.g., AP A and AP B), this message can arrive at receiver A with time $T_A$ and at receiver B with time $T_B$. The TDoA for this message can be calculated between the locations of receivers A and B as the positive constant k:

$$TDoA_{B-A} = |T_B - T_A| = k$$

The value of $TDoA_{B-A}$ can be used to construct a hyperbola with foci at the locations of receivers A and B. This hyperbola may represent the locus of all the points in the x-y plane, the difference of whose distances from the two foci is equal to k(c) meters. Mathematically, this represents all possible locations of the client device such that:

$$|D_{XB} - D_{XA}| = k(c)$$

The probable location of the client device can then be represented by a point along this hyperbola. To further resolve the location of the client device, a third receiving device C can be used to calculate the message time difference of arrival between the receivers C and A, or:

$$TDoA_{C-A} = |T_C - T_A| = k_1$$

Knowledge of the constant $k_1$ can allow for the construction of a second hyperbola representing the locus of all the points in the x-y plane, the difference of whose distances from the two foci (i.e., the receivers A and C) can be equal to $k_1(c)$ meters. Mathematically, this can be seen as representing all possible locations of the client device such that:

$$|D_{XC} - D_{XA}| = k1(c)$$

A fourth receiving device and third hyperbola may be added as an enhancement to perform TDoA hyperbolic multi-lateration. This may be required to solve for cases where there may be more than one solution when using TDoA hyperbolic tri-lateration.

Lateration can also be performed by using RSS in place of time. With this approach, RSS can be measured by either the client device 228 or the receiving device. Knowledge of the transmitter output power, cable losses, and antenna gains as well as the appropriate path loss model may allow for resolution of the distance between the two devices.

In an example embodiment, a path loss model can be defined as:

$$PL = PL_{1meter} + 10 \log(d^n) + s,$$

where PL can represent the total path loss experienced between the receiver and the client device in dB, $PL_{1Meter}$ can represent the reference path loss in dB for the desired frequency when the receiver-to-transmitter distance is 1 meter, d can represent the distance between the client device and receiver in meters, n can represent the path loss exponent for the environment, and s can represent the standard deviation associated with the degree of shadow fading present in the environment, in dB.

In an example embodiment, given known quantities for transmit power, path loss, antenna gain, and cable losses, receiver signal strength can be calculated as:

$$RX_{PWR} = TX_{PWR} - Loss_{TX} + Gain_{TX} - PL + Gain_{RX} - Loss_{RX}$$

Replacing the path loss equation above, and solving for d yields:

$$d = 10^{((TX_{PWR} - RX_{PWR} - Loss_{TX} + Gain_{TX} - PL_{1meter} + Gain_{RX} - Loss_{RX})/10n)},$$

where $Rx_{PWR}$ can represent the detected receive signal strength in dB, $Tx_{PWR}$ can represent the transmitter output power in dB, $Loss_{TX}$ can represent the sum of all transmit-side cable and connector losses in dB, $Gain_{TX}$ can represent the transmit-side antenna gain in dBi, $Loss_{RX}$ can represent the sum of all receive-side cable and connector losses in dB, and $Gain_{RX}$ can represent the receive-side antenna gain in dBi.

Solving for the distance between the receiver and client device 228 can allow a circular area to be plotted around the location of the receiver, using the distance d as the radius.

The location of the client device 228 can be estimated to be somewhere on this circular plot. As in other techniques, input from other receivers can be used to perform RSS tri-lateration or RSS multi-lateration to further refine location accuracy.

Angulation-based or angle-based techniques for determining a client device location can utilize the angle of incidence at which signals arrive at receiving devices (e.g., APs). Geometric relationships can then be used to estimate location from the intersection of two lines of bearing (LoBs) formed by a radial line to each receiving device. In a two-dimensional plane, at least two receiving devices may be required for location estimation with improved accuracy coming from at least three or more receiving devices (tri-angulation or multi-angulation). In an example embodiment, multiple element antenna arrays can be used to sample the receiving signal. Electronic switching can be performed between arrays or portions of each array, and mathematical computations handled by a background computing system can be used to extract the angles of incidence. This technique may involve calculating TDoA between elements of the array by measuring the difference in received phase at each element. In a properly constructed array, there may be a small but discernible per element arrival time and a difference in phase. Sometimes referred to as reverse beam-forming, this technique can involve measuring the arrival time of the signal at each element, computing the TDoA between array elements, and converting this information to an angle of arrival (AoA) measurement. This may be possible because the signal from each element is time-delayed (phase shifted) to steer the gain of the antenna array in beam-forming. A drawback of an AoA approach may be its susceptibility to multipath interference. Although AoA techniques may work well in sites with a direct line of sight, such approaches can suffer from decreased accuracy and precision in sites with signal reflections from surrounding objects.

Location patterning can be based on the sampling and recording of signal behavior patterns in specific environments. Location patterning techniques assume that each potential device location possesses a distinctly unique signal signature and that each floor or subsection of a site possesses unique signal propagation characteristics. In some example embodiments, location patterning can be based on RSSI signatures. In other example embodiments, pattern recognition can be extended to include ToA, AoA, and/or TDoA-based signatures. Deployment of patterning-based positioning systems can typically be divided into two phases—calibration and operation.

During the calibration phase, data can be accumulated by performing a walk-around of the site with the client device 228 and allowing multiple receiving devices (e.g., APs) to sample the signal strength of the client device. A graphical representation of the area to be calibrated can be overlaid with a set of grid points or notations to guide the operator in determining precisely where sample data should be acquired. At each sample location, the array (or location vector) of RSS values associated with the calibration device can be recorded into a database known as a radio map or training set. The size of the vector for this sample can be determined by the number of the receiving devices that can detect the client device 228.

Due to fading and other phenomena, the observed signal strength of the client device 228 at a particular location may vary over time. As a result, calibration phase approaches may record many samples of signal strength for the client device 228 during the sampling process. Depending on technique, the actual vector array element recorded may account for this variation using one or more approaches. In an example embodiment, the array element associated with any specific receiver can be represented as the mean signal strength of all measurements of the client device 228 made by that receiver for the reported sample coordinates. The location vector can therefore represent a vector array of mean signal strength elements.

In the operational phase, a group of receiving devices can provide signal strength measurements pertaining to the client device 228 and forward that information to a location tracking server. The location server can use a complex positioning algorithm and the radio map database to estimate the location of the client device 228. The server may then report the location estimate to the location client application requesting the positioning information. The location patterning positioning algorithms can be classified into three groups—deterministic, probabilistic, or other algorithms.

Deterministic algorithms attempt to find the minimum statistical signal distance between a detected RSSI location vector and the location vectors of the various calibration sample points. Distance measurements can be based on the computation of Euclidean, Manhattan, or Mahalanobis distances. Probabilistic algorithms can use probability inferences to determine the likelihood of a particular location given that a particular location vector array has already been detected. The calibration database may be considered as an a priori conditional probability distribution by the algorithm to determine the likelihood of a particular location occurrence. Probabilistic algorithms can be based on Bayesian probability inferences. Other techniques can include decision trees, ensembles (e.g., bagging, boosting, random forest), nearest neighbor, linear regression, neural networks, support vector machines (SVM), and other classification techniques.

Fingerprinting-based approaches for determining client device location combine the simplicity of a lateration-based approach with the customized calibration capabilities and indoor performance previously available only in location patterning solutions. For example, fingerprinting can involve lateration calculations using signal propagation models developed from propagation data gathered directly from the target environment or similar environments. In addition, fingerprinting can generate a model of a particular environment in a fashion similar to but that may be more expeditious than location patterning.

In addition to the use of prepackaged propagation models, fingerprinting can be used to develop customized models that are based on on-site data collection. This process may allow for the overall attenuation characteristics of the actual environment to be taken into consideration during the derivation of both 2.4 GHz and 5 GHz path loss models. For each calibration grid location, the physical location coordinates of the client device 228 can be recorded along with the RSS's from three or more receiving devices.

The data accumulated during the calibration phase can be statistically processed and groomed, then used to build a propagation model for predicting the client device's RSSI around each receiving device, where the path loss exponent, shadow fading standard deviation, and $PL_{1meter}$ values can be calculated from the sample calibration data in order to reflect specific propagation anomalies present in the environment. This process can include several computational cycles where the parameters for lateration can be calculated for each band. The minimum mean square error (MMSE) estimation technique can be used to obtain the initial values for the parameters.

To locate the client device 228 during the operational phase of fingerprinting, RSS multi-lateration can be performed using either a pre-packaged model or a customized model created during the calibration phase. This process can yield the coordinates of the data point with the highest potential of correctly representing the client device's current location. Additional information gleaned from statistical analysis of the distribution of calibration data can be used to further improve location accuracy and precision.

In the example embodiment of FIG. 2, the client device 228 is a smartphone, but it will be appreciated that the client device 228 can be any other device capable of electronically transmitting and receiving audio, video, and/or other data over a distance, such as a server, desktop computer, laptop, tablet, desk phone, or wearable device. The client device 228 can include a carrier band telephony app 242 for making phone calls through a network of a cellular carrier. The client device 228 can also include a Wi-Fi telephony app 244 to enable the client device to make phone calls through infrastructure of the private network 204. For example, the Wi-Fi telephony app 244 may include a VoIP component that can be implemented in hardware, firmware, and/or software, to provide Internet-based telephony for the client device 228.

Figure 3A:
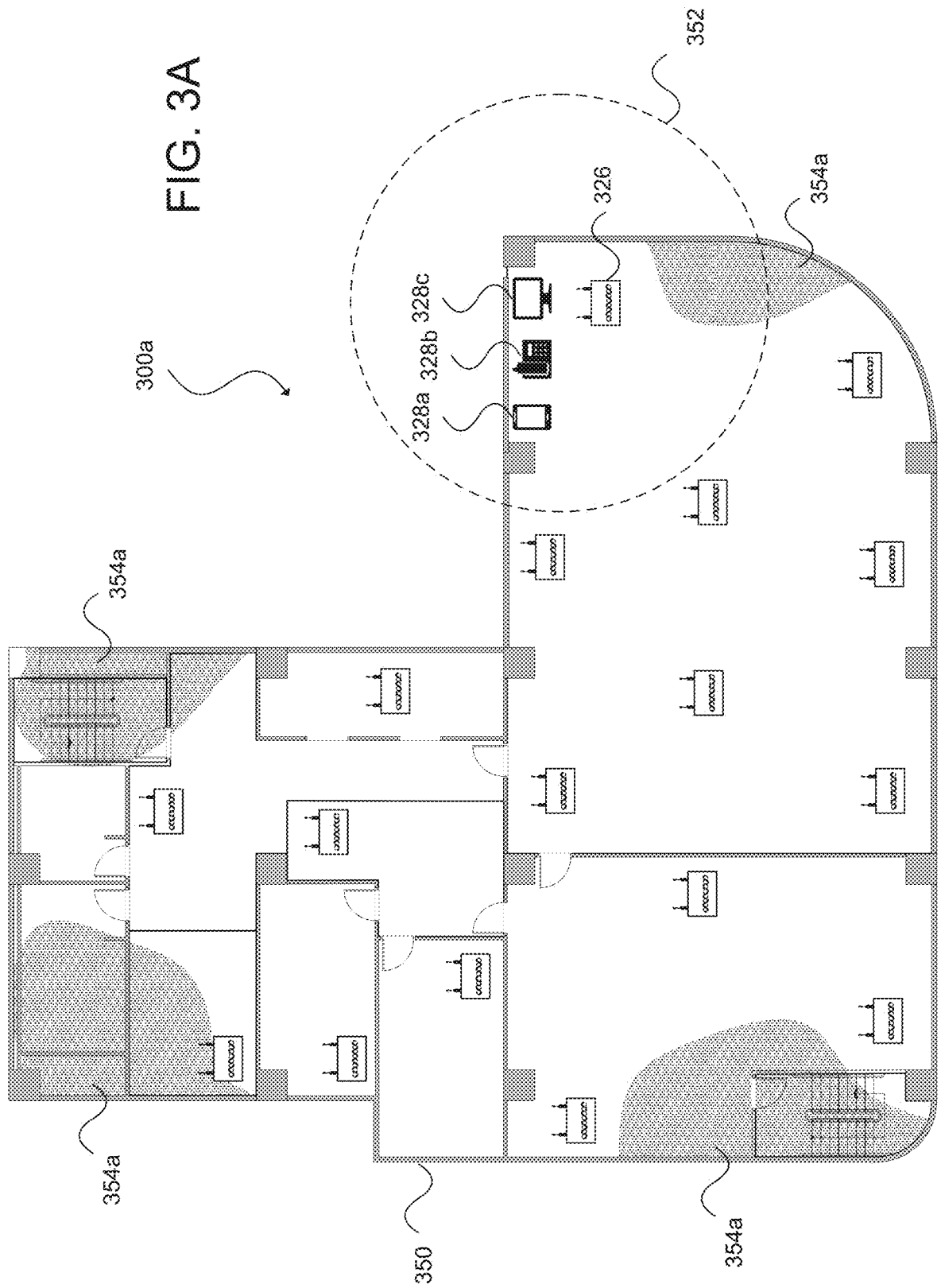

FIG. 3A illustrates an example of an environment 300a in accordance with an example embodiment. The environment 300a shows a floorplan view of an office 350 including a WLAN that comprises a number of APs 326 distributed throughout the office. For purposes of clarity, FIG. 3A shows only one wireless range 352 of one of the APs 326. It should be understood that each of the APs 326 can have a wireless range 352 that can represent a range of a Wi-Fi (e.g., IEEE 802.11), Bluetooth, ZigBee, Wireless Universal Serial Bus (USB) or ultra-wide band (UWB), or other RF, infrared, ultrasonic, or other wireless technology component incorporated in each of the APs. The environment 300a can also include any number of client devices associated with any number of users. Again for purposes of clarity, FIG. 3A only shows one set of devices associated with a single user, including a smartphone 328a, a desk phone 328b, and a laptop 328c (collectively, client devices 328).

One or more of the APs 326 may have a wired connection to a LAN interface (not shown) for access to an external network (and access by a network controller, such as the network controller 210 of FIG. 2). In an example embodiment, one or more of the APs 326 may be connected to an access switch (e.g., access switch 124 of FIG. 1) which may be connected to a gateway (e.g., private cloud gateway 118 of FIG. 1) for access to the external network, such as an ISP or the Internet. In another example embodiment, one or more of the APs 326 may be directly connected to a gateway which can provide the APs with access to the external network. As will be understood by one of ordinary skill in the art, various other network configurations can be deployed to provide the APs 326 with access to the external network.

FIG. 3A also illustrates "cold" zones 354a inside the office 350 encompassing overlapping wireless ranges of two or fewer of the APs 326 or other nodes of the WLAN. A heat map can indicate the wireless signal strength of the nodes of the WLAN in the environment 300a. In particular, cold zones 354a can represent regions inside the office 350 only covered by two or fewer APs 326 or other nodes of the WLAN. Thus, although a location of a client device within one of the cold zones 354a can be estimated, the location may not be as precise as "warmer" zones (i.e., zones within the wireless ranges of three or more APs 326 or other nodes of the WLAN) because only two signal measurement reports from the APs may be available for angulation, lateration, fingerprinting, and other techniques for determining the location of a client device discussed herein and known to one of ordinary skill in the art.

In an example embodiment, FIG. 3A can represent one of the interfaces of a dashboard, such as the dashboard 234 of FIG. 2. As an example, the dashboard can include a graphical user interface that displays a floor plan in which the WLAN is located, and the interface can include graphical elements corresponding to where elements of the WLAN are located in the floor plan. These graphical elements can correspond to locations of access switches (e.g., access switch 124 of FIG. 1), the APs 326, the client devices 328, and other elements of the WLAN. In an example embodiment, a user's client device 328 last detected to move in the WLAN can be a proxy for the location of the user.

The dashboard can also include a heat map indicating the wireless strength signals of the nodes of the WLAN of environment 300a. In an example embodiment, the heat map can be utilized for determining the placement of new APs or other nodes. For instance, the dashboard can display a graphical element indicating an optimal placement for a new AP or other node to maximize the wireless signal strength of the WLAN cumulatively or minimize the cold zones 354a. The graphical element can be a geolocation (e.g., longitude, latitude) or other coordinates of a point, or a geographical region (e.g., a circular geographical region with a geolocation or other coordinates of a point as an origin and a specified radius or a convex or concave polygon defined by multiple geolocations or other coordinates of multiple points).

In some example embodiments, "full" coverage (i.e., the entirety of an environment being within the wireless ranges of three or more APs or other devices for facilitating location determination) can be obtained in an environment 300b by distributing beacons 356 in zones 354b, such as illustrated in FIG. 3B. Beacons are typically small, inexpensive, low power electronic devices that can broadcast small amounts of data wirelessly over a distance. However, any electronic device that can broadcast wireless data over a distance may also act as beacons, including a server, desktop computer, laptop, tablet, desk phone, smartphone, wearable device, etc.

In some example embodiments, the beacons 356 can implement the Bluetooth® Low Energy (BLE) protocol. BLE beacons can operate in various modes depending on configuration, such as broadcast mode, scan mode, controller mode, or peripheral mode. In the broadcast mode, the BLE beacon can periodically transmit broadcast data and may respond with more information upon request from another device. In the scan mode, the BLE beacon can listen for broadcast data transmitted by other devices and may request additional information if operating in active scan mode. In controller mode, the BLE beacon can scan for broadcast data and send a connection request upon receiving broadcast data from a BLE-enabled device. In the peripheral mode, the BLE beacon can broadcast data and allow a connection upon receiving a connection request. In the peripheral mode, the BLE beacon may only have connection at a time while a BLE in the controller mode may have multiple connections with BLE beacons in the peripheral mode.

Figure 4:
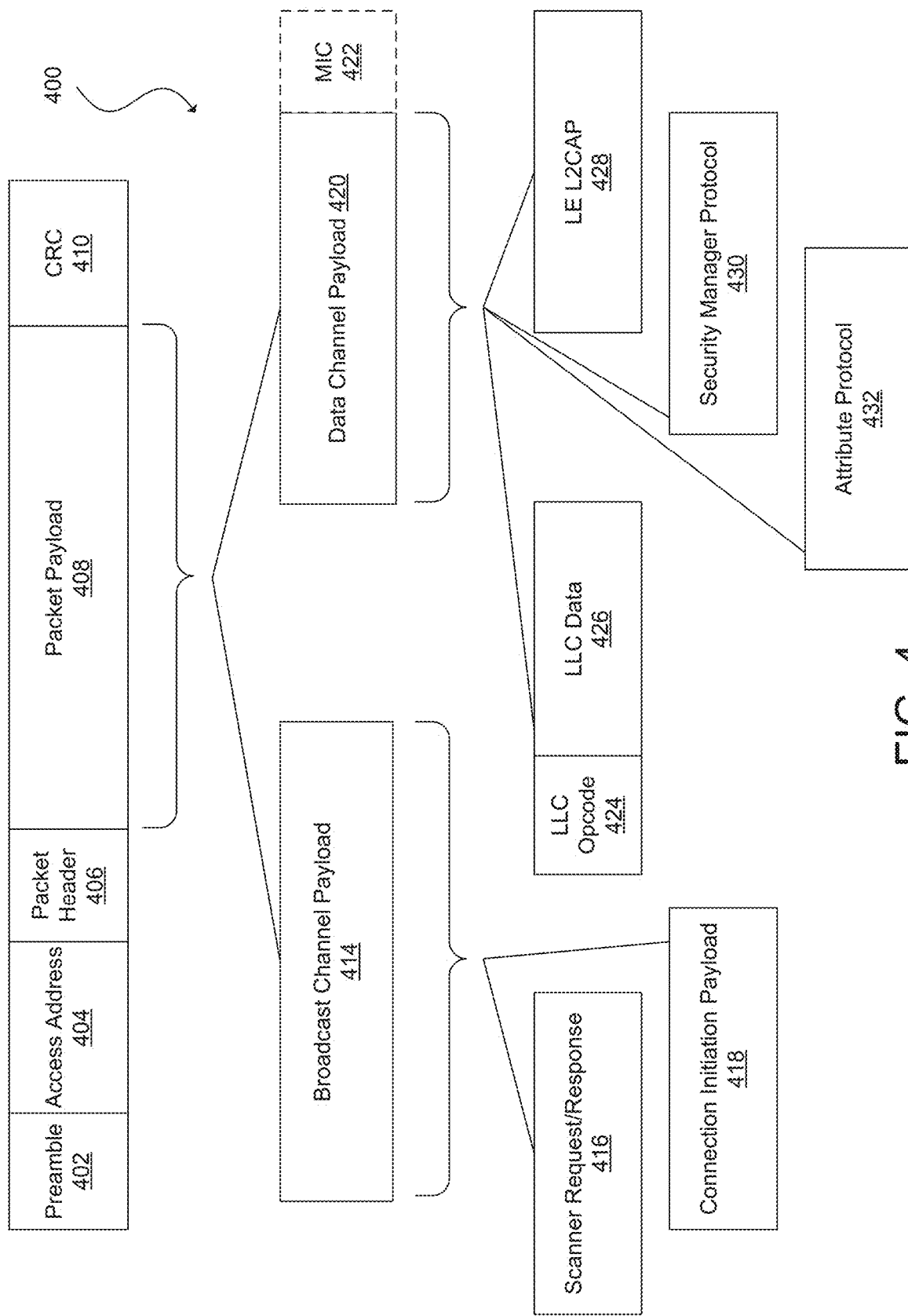
FIG. 4 illustrates an example packet that can be broadcast and/or scanned by an example electronic device in accordance with an example embodiment.

BLE beacons may consume less power, particularly compared to other Bluetooth® standards, by residing in sleep mode a majority of the time and waking briefly to broadcast or scan for data. FIG. 4 illustrates an example packet 400 that a beacon, such as one of the beacon 356 of FIG. 3B, can broadcast and/or scan in accordance with an example embodiment. Generally, the BLE packet can include a 1-byte preamble 402, a 4-byte access address 404, a 2-byte packet header 406, a packet payload of various sizes up to 37 bytes, and a 3-byte cyclic redundancy check (CRC) 410. The preamble 402 can be used for synchronization and timing estimation at a receiving device, such as one of the client devices 328 of FIG. 3B. The access address 404 can correlate with an RF channel number used by the BLE beacon. The packet header 406 can be used to describe the packet type. The CRC 410 can be an error-detecting code that may be used to validate data integrity for the packet 400.

Different packet types can be sent depending on if the packet is transmitted over a broadcast channel or a data channel. A packet can be sent over the broadcast channel for carrying the BLE beacon's discovery and connection establishment information. For example, the broadcast channel packet can comprise a broadcast channel payload 414 that may include payloads of various sizes, such as a scanner request/response 416 or a connection initiation payload 418. Further, an active scanner may request up to 31 additional bytes from the broadcasting beacon if the broadcast mode on the beacon allows such an operation. Thus, a sizable portion of data can be received from the broadcasting beacon even without establishing a connection.

When a connection is established, a packet can be transmitted over the data channel for carrying link control data and payloads for higher lever protocols. For instance, a data channel packet can comprise a data channel payload 420 and optional message integrity check (MIC) data 422 if a link layer connection is encrypted. The data channel payload 420 can comprise a link layer control (LLC), that can include an LLC opcode 424 and LLC data 426; a low energy LLC and Adaptation (LE L2CAP) signaling channel 428; a Security Manager protocol payload 430; or an attribute protocol 432.

A BLE beacon operating in controller mode can provide channel and timing of a data exchange between the BLE beacon operating in the controller mode and a BLE beacon operating in the peripheral mode. The channel and timing information can include a connection interval and latency. The connection interval can specify a time between the start of the data packet exchange sequence or connection events. Latency, on the other hand, can be a number of communication intervals that the BLE beacon operating in the peripheral mode may ignore without losing the connection. Latency can give the BLE beacon operating in the peripheral mode an opportunity to optimize and preserve power consumption.

The BLE beacon operating in the controller mode can also initiate each communication event to serve as an anchor point to calculate the time for the next event. During a communication event, the BLE beacon operating in the controller mode and the BLE beacon operating in the peripheral mode can alternate sending and receiving packets until either side stops sending packets, at which point the current event may be considered closed and the data exchange can be suspended until the next communication event.

In the BLE protocol, broadcast intervals can be set in a range of 20 ms to 10 s. The broadcast interval can specify an amount of time between consecutive broadcast packets. Broadcasting can be performed sequentially on all the enabled channels. In the scan mode, the BLE beacon may specify a scan window, which can determine the duration of the scan as well as the scan interval.

A BLE beacon can use a DC power supply, batteries, solar power, kinetics harvesting, etc. The maximum output specified by the BLE protocol is 10 decibel-milliwatt (dBm), which can enable the BLE beacons to have wireless ranges for up to several hundred meters. The BLE beacons may operate in the 2.4 GHz frequency band, and can use channels in that band to avoid collision with commonly used Wi-Fi channels.

Returning to FIG. 3B, the BLE beacons 356 can be seen dispersed proximate to zones 354b to enable each client device 328 located in a zone 352b to be within the wireless ranges of three or more APs 326 or beacons 356 in order to determine the location of the client device 328 positioned in the zone 352b more accurately. A network controller, one or more of the APs 326, one or more of the client devices 328, and/or another device in the environment 300b can manage the APs 326 and the beacons 356 for determining the location of each client device 328 within the environment 300b. In one example embodiment, the locations of the beacons 356 may be known. For example, the networker controller or other device for facilitating determination of a location (i.e., location determination system) can generate a heat map based on the wireless signal strength of APs 326, such as shown in FIG. 3A. A network administrator can utilize the heat map to place the beacons 356 in "cold" zones and record the placements of the beacons. The known locations of the APs 326 and beacons 356 may be treated as "anchor nodes," and the location of the client device 328 can be treated as a "non-anchor node" in determining the position of the client device. Thus, the networker controller or other location determination system may be capable of calculating the position of the client device 328 in one of the zones 354b more accurately than one of the cold zones 354a shown in FIG. 3A.

In another example embodiment, only the locations of APs 326 may be known. The location of the client device 328 can be estimated jointly with the locations of the beacons 356. For instance, the locations of the APs 326 can be treated as anchor nodes, and the locations of the beacons 356 and the client device 328 can be treated as non-anchor nodes in determining the location of the client device. The network controller or other location determination system can obtain RSSIs or other measurement data based on wireless transmissions between the client device 328 and one of the APs 326, the beacons 356 and the client device 328, and the beacons 356 and APs 326. Based on the obtained measurement data, the network controller or other location determination system can calculate the position of each beacon 356. Once all of the beacons 356 have been located, the network controller or other location determination system can calculate the position of each client device 328.

In an example embodiment, the network controller or other location determination system may first calculate the position of the client devices 328, and subsequently compute the positions of the beacons 356. In another example embodiment, the network controller or other location determination system can alternate between initially resolving the positions of the client devices 328 and beacons 356. In yet another example embodiment, once the positions of the beacons 356 have been calculated, the network controller or other location determination system may save the positions of the beacons 356 as known positions, and only update the positions of the client devices 328.

In this manner, the network controller or other location determination system can use additional information to locate the beacons 356 to enhance the accuracy of the determined positions of the client device 328. By using measurement information obtained from the transmissions between the APs 326 and the beacons 356, the client device 328 and the AP 326, and the beacons 356 and the client device 328, the network controller or other location determination system can provide location-based functions to the client device based on a more accurate position of the client device.

Figure 5:
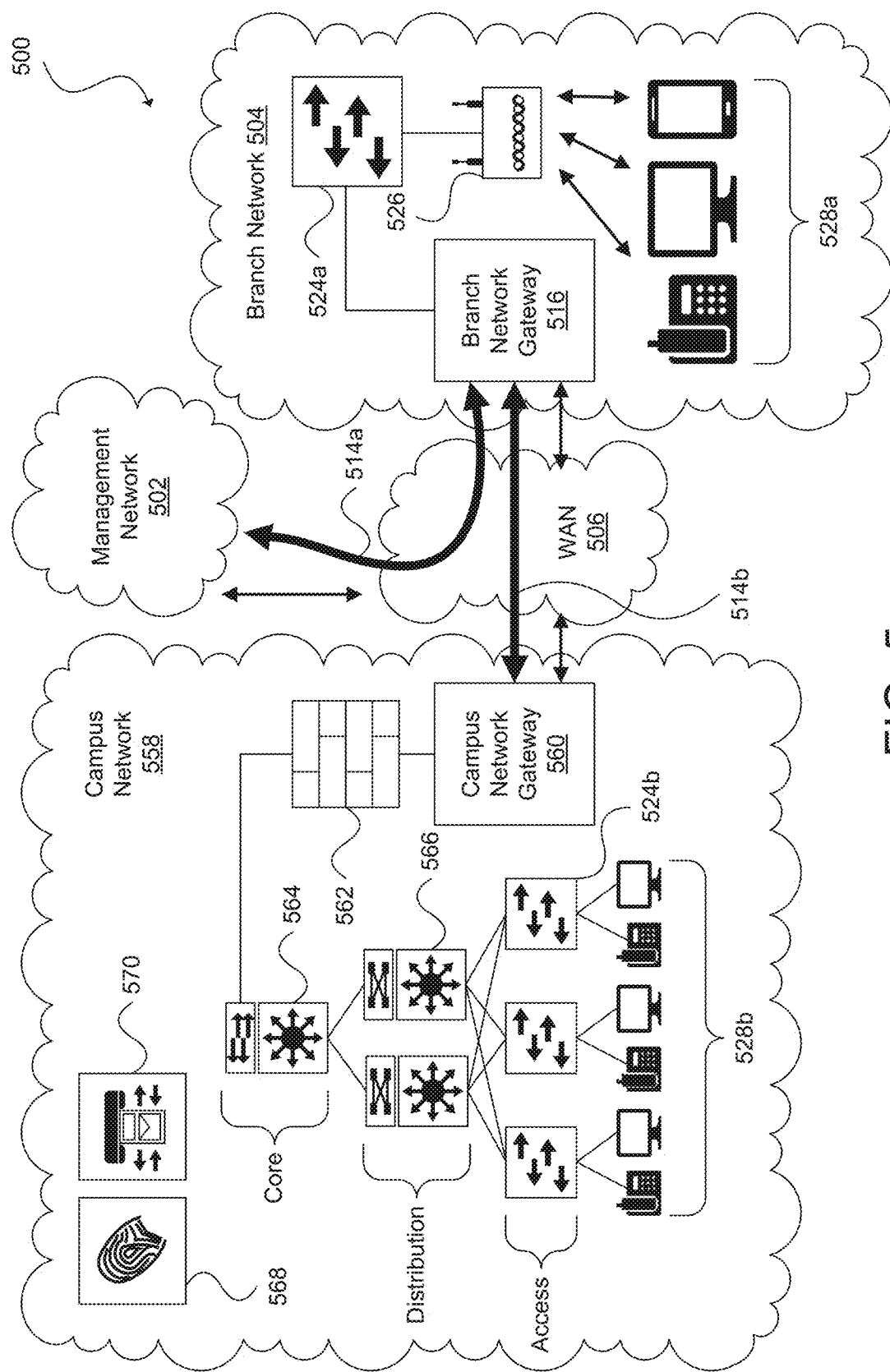
FIG. 5 illustrates an example network environment for providing a location-based function to an example client device in accordance with an example embodiment.

In some example embodiments, accurate location information can be coupled with a client device's Voice over Internet Protocol (VoIP) capabilities to provide new features or improve existing features of VoIP-enabled client devices. FIG. 5 illustrates an example network environment 500 for providing location-based functions for VoIP-enabled client devices in accordance with an example embodiment. The network environment 500 can include a management network 502, a branch office network 504, a WAN 506 (e.g., the Internet), and a campus network 558. The campus network 558 and the branch office network 504 can form an enterprise network. The management network 502 can represent a simplified configuration of the network management cloud 102 of FIG. 1 or the management network 202 of FIG. 2. A secure connection 514a can be established between the management network 502 and the branch office network 504 through the WAN 506 via a management network gateway (not shown) in the management network 502 and a branch office network gateway 516 in the branch office network 504. A user may access the management network 502 through an interface (not shown) of the management network, such as a web-based GUI, client application GUI, command line interface, application programming interface (API), etc., to control and monitor various components of the management network 502 and the branch office network 504, including the secure connection 514a, the branch office network gateway 516, one or more access switches 524a, one or more APs 526, and one or more VoIP-enabled client devices 528a. In an example embodiment, the interface can be implemented using the Meraki® platform.

In the branch office network 504, the VoIP-enabled client devices 528a can have wireless connections to the AP 526 or wired connections to the access switch 524a, which in turn can connect to the branch office network gateway 516 for providing the VoIP-enabled client devices 528a connectivity to the WAN 506. In an example embodiment, the branch office network gateway 516 can be implemented using a Meraki® MX Family security appliance, the access switch 524a can be implemented using a Meraki® MS family switch, and the AP 526 can be implemented using a Meraki® MR Family AP. In some example embodiments, the branch office network 504 can also include beacons, such as the BLE beacons 356 of FIG. 3B, dispersed throughout the branch office to enable the location of the user to be more accurately detected.

The campus network 558 can include a campus network gateway 560 to provide connectivity of various elements of the campus network to the WAN 506. The campus network gateway 560 can also be used to establish a secure connection 514b with the branch office network gateway 516 to interconnect the campus network 558 and the branch office network 504. In an example embodiment, the campus network gateway 560 can be implemented using the Cisco® Aggregation Services Router (ASR) 1000 edge router.

The campus network 558 can also include a firewall 562 between the campus network gateway 560 and a network fabric for providing the client devices connectivity to the WAN 506. In the example of FIG. 5, the network fabric has a hierarchical or multi-tiered architecture including one or more core switches 564 in a core layer, one or more distribution switches 566 in a distribution layer, and one or more access switches 524b in a distribution layer. In an example embodiment, the switches of the network fabric can be implemented using Catalyst® series switches from Cisco®.

In another example embodiment, the network fabric can be designed using a two-tier Clos architecture. That is, the network fabric can be configured as a two-tier, spine-leaf bipartite graph in which each leaf switch connects to each spine switch (though a full mesh is not required in some example embodiments), and there are no direct connections between leaf switches nor between spine switches. In this example embodiment, the switches of the network fabric can be implemented using Cisco Nexus® series switches. In other example embodiments, various other network configurations can be utilized as would be known to one of ordinary skill in the art.

The campus network 558 can also include a security policy management platform 568 that automates and enforces security access to resources of the campus network 558 and the branch network 504. In an example embodiment, the security policy management platform 568 can be implemented as a virtual machine (VM) or VM cluster operating the Cisco® Identity Services Engine (ISE). The campus network can also include a call control and routing platform 570 that can provide services such as bandwidth management, dial plans, directory and identity management services, etc. Bandwidth management can provide mechanisms for ensuring voice and video quality and for preventing oversubscription of network bandwidth by limiting the number of calls that are allowed on the network at a given time. Dial plans can provide numbering for VoIP-enabled client devices 528a and 528b (collectively, VoIP-enabled client devices 528), dialed digits analysis, and classes of restriction to limit types of calls that a user can make. Directory and identity management services can provide applications with a standard method for accessing and potentially modifying the information stored in a directory. Identity management and single sign-on can ensure that user access and identification is secure. These capabilities can enable companies to centralize user information in a single repository available to several applications, which can provide better access to the information and reduce maintenance costs. In an example embodiment, the call control and routing platform 570 can be implemented as a VM or VM cluster operating the Cisco® Unified Communications Manager (UCM). Although the example of embodiment of FIG. 5 illustrates the security policy management platform 568 and the call control and routing platform 570 as located in the campus network 558, it will be appreciated that these systems and other components of the campus network (e.g., firewall 562) can reside in the management network 502 or the branch network 504 in other example embodiments.

In an example embodiment, more precise location information can be used to improve call forwarding, call pick-up, or follow-me features of the VoIP-enabled client devices 528. Conventional approaches for call-forwarding, call pick-up, and follow-me (also sometimes referred to as find-me) may not take a physical location of a user into account and can require extensive manual configuration. In conventional call forwarding, the user must manually set a phone number or network address (e.g., uniform resource identifier (URI), IP address, or MAC address) to forward calls to the new number or address, and manually disable call forwarding to stop operation of this feature. Similarly, conventional call pick-up requires the user to manually activate the conventional VoIP device to receive a second user's phone calls and manually deactivate this feature to stop receiving the second user's calls. Manually setting and resetting call forwarding and/or call pick-up can be onerous for the user, and oftentimes the user may forget to disable these features such that critical phone calls can be missed.

In conventional follow-me or find-me, the user can manually designate multiple phone numbers or network addresses for receiving a call and each of those devices will simultaneously ring, vibrate, or otherwise alert the user of an incoming call. This behavior can be jarring for some users as it may be preferable to have a single device receive a call. Thus, another conventional approach of implementing follow-me or find-me is to assign an order and duration for one device to receive the call at a time. For instance, a first conventional VoIP-enabled client device can be configured to receive an incoming call for 15 seconds, then the call may be forwarded to a second conventional VoIP-enabled client device for 30 seconds, and finally the call may be forwarded to a voice mail application. However, callers may hang up before the second conventional VoIP-enabled client device or the voice mail application receive the call. VoIP call forwarding or follow-me can be improved by relying on location information. For example, instead of blindly forwarding to a designated device or multiple devices, a phone call can be intelligently forwarded to a single VoIP-enabled client device based on the proximity of the user to the device.

Certain conventional systems provide mobility features that enable a user to originate calls from personal VoIP-enabled client devices as if the calls were made through the enterprise. This feature can enable centralized billing and call detail records, and provide cost savings by ensuring that calls get billed to the enterprise rather than the user's mobile or cellular carrier plan. This mobility feature may also mask the phone number of the user's personal VoIP-enabled client device from persons receiving calls. One potential wrinkle with this feature in conventional systems is the situation in which an emergency call is made using a personal VoIP-enabled client device through the enterprise infrastructure. Some conventional systems attempt to overcome this problem by requiring the user to confirm or update the user's location but this is an incomplete solution because the user may not be diligent about providing the user's actual physical location. This can create a potential disaster for the user and/or emergency response personnel in the event the user makes an emergency call and the user's location is unknown or mapped to the wrong location.

In an example embodiment, the call control and routing platform 570 can receive an emergency call, originating from the enterprise, made from the user's personal VoIP-enabled client device 528. The call control and routing platform 570 may request the position of the user's personal VoIP-enabled client device from a network controller or other location determination system of the enterprise network (i.e., the campus network 558 and the branch network 504) and map the position to an Emergency Location Identification Number (ELIN). An ELIN can be a Direct Inward Dial (DID) number that a Public-Safety Answering Point (PSAP) operator can dial to reconnect to the user if the emergency call is cut off or if the PSAP operator needs to talk to the user again. The ELIN can map to an emergency response location (ERL) corresponding to the user's location determined by the network controller or other location determination system. A PSAP operator may be responsible for answering the emergency call and arranging the appropriate emergency response, such as sending police, fire, or ambulance teams. The call control and routing platform 570 can route the call to the PSAP associated with the user's location. In an example embodiment, the PSAP operator can search an Automatic Location Identifier (ALI) database to retrieve the user's location based on the ELIN, and send the location information for the user's personal VoIP-enabled client device 528 to an emergency operator terminal. In some embodiments, additional information can also be sent via a private switch ALI (PS/ALI). The PS/ALI is an enhancement to 911 emergency response systems that enables a telephony system to provide more specific address and location information for each client device. The service may allow a customer-generated address table to be loaded into the ALI database so that each client device of the telephony system can be uniquely identified if a call is placed to 911. In an example embodiment, the ELIN can be passed directly to the E911 system to pinpoint the precise location of the user. The PSAP operator can then direct emergency response personnel to the correct address, building, floor, room, or even cubicle, thereby streamlining operations and increasing accuracy.

Certain conventional VoIP-enabled client devices provide a "do not disturb" feature that turns off the volume of a ringer when the user does not want to be disturbed by incoming calls. Some conventional VoIP-enable client devices can also work in conjunction with one another to operate as a public address (PA) or intercom system. A user must manually activate these features on the conventional VoIP-enable devices but the user may forget to deactivate these features and miss important calls, PA messages, intercom messages, etc. In an example embodiment, location information can be used to avoid some of the problems of the conventional VoIP-enabled client devices. For instance, a network controller or other location determination system can maintain historical position data associated with a VoIP-enabled client device 528, such as a number and identity of users proximate to the VoIP-enabled client device. If the network controller or other location determination system detects that there are more than the typical number of users proximate to the VoIP-enabled client device 528 or a user not normally associated with or proximate to the VoIP-enabled client device, it may be assumed that the user(s) are interacting with the unassociated user and the volume of the VoIP-enabled client device can be turned down or muted so as not to disturb interaction between and among the users.

Figure 6:
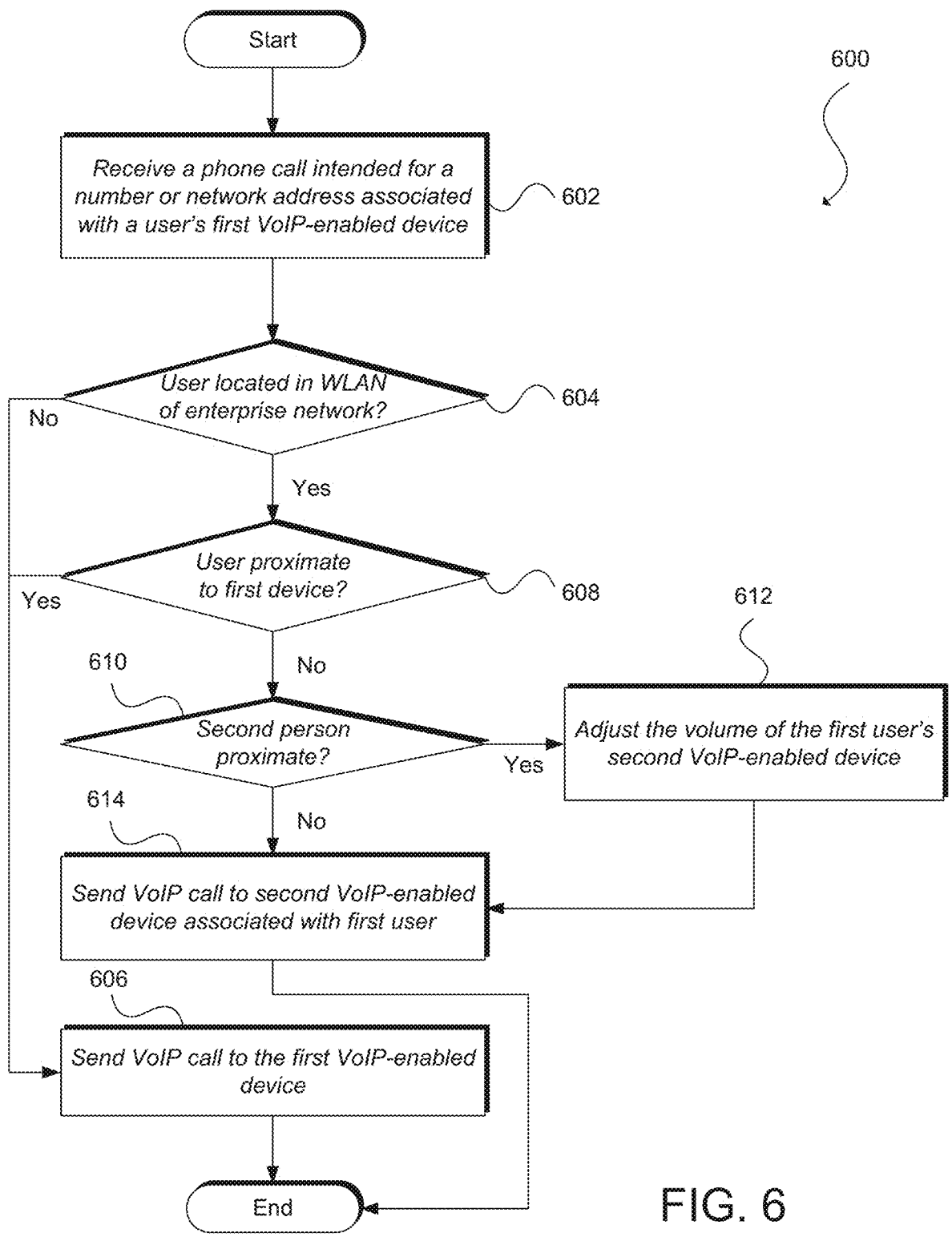
FIG. 6 illustrates an example process for providing a location-based function to an example client device in accordance with an example embodiment.

FIG. 6 illustrates an example process 600 for providing some of the location-based functions described above to a VoIP-enabled client device in accordance with an example embodiment. It should be understood that, for any process discussed herein, there can be additional, fewer, or alternative steps performed in similar or alternative orders, or in parallel, within the scope of the various example embodiments unless otherwise stated. In the example of FIG. 6, the location of a client device associated with a user can be a proxy for the location of the user. For instance, the user may be associated with a laptop, tablet, desk phone, smartphone, wearable device, a security access card incorporating a BLE beacon, etc. In some example embodiments, it may be assumed that the user is located at where one or more of the user's client devices is located, such as the client device that most recently moved in an environment or the client device that last received a user input. In other example embodiments, a specific client device can be designated as the proxy for the user's location. For instance, many users typically carry their smartphones with them throughout the day, and thus, a location of a user's smartphone can be used to indirectly determine the user's location. Alternatively, or in addition, a network management system (e.g., network management system 110 of FIG. 1), network controller (e.g., network controller 210 of FIG. 2), or similar system, can establish conditional rules for determining a user's location based on a location of one or more of the user's client devices. For example, during typical business hours (e.g., 9 am to 12 pm and 1 pm to 6 pm), the location of the user's laptop can serve as a proxy for the user's location unless the user has a scheduled meeting. Another conditional rule can establish that the user's location is based on the location of a desk phone within a conference room at which the meeting is scheduled. Yet another conditional rule may provide that the user's smartphone is to be utilized for determining the user's location during lunch hour (e.g., 12 pm to 1 pm). It is contemplated that there can be many other conditional rules that can be implemented in accordance with the various example embodiments that a person having ordinary skill in the art would recognize. In still other example embodiments, the user may specify a particular client device to be used for ascertaining the user's location or the user may customize existing conditional rules discussed and/or or define her own conditional rules.

The process 600 can be initiated at step 602 by receiving a voice communication (e.g., a phone call, videoconferencing request, PA message, intercom message, voicemail message) or other communication capable of being received by a VoIP-enabled client device (e.g., email, Short Message Service (SMS) text message, instant messaging (IM) message, etc.) intended for a phone number or network address (e.g., URI, IP address, MAC address, etc.) associated with a user's first VoIP-enabled client device. For example, a call control and routing platform (e.g., call control and routing platform 570 of FIG. 5) a network management system (e.g., network management system 110 of FIG. 1), a network controller (e.g., network controller 210 of FIG. 2), or similar system, can receive a phone call intended for the user's first VoIP-enabled client device, which can include a desktop computer, laptop, or tablet incorporating VoIP software, an IP desk phone, a smartphone or a wearable device capable of performing Wi-Fi calling, or other client device having a microphone or other input component (e.g., keyboard), a speaker or other output component (e.g., display screen), network connectivity, and VoIP client software.

In some example embodiments, the various location-based VoIP functions discussed above with respect to FIG. 5 can be activated based on the user being located on-premises or located within a wireless range of a WLAN of an enterprise network. Thus, the process 600 can continue at step 604 by determining whether the user is physically located somewhere on enterprise grounds. For example, the call control and routing platform, network management system, network controller, or similar system can request for the user's location from a network controller (e.g., network controller 210 of FIG. 2), an AP (e.g., AP 126 of FIG. 1), a client device (e.g., client device 228 of FIG. 2), or other location determination system of the enterprise network.

If the user is not on-premises, the process 600 can proceed to step 606 at which the call control and routing platform, network management system, network controller, or similar system can invoke a default call routing rule to send the call to the user's first VoIP-enabled client device and the process 600 may conclude. In some example embodiments, the user can be on-premises if the user (or an associated VoIP-enabled client device) is located in any WLAN of the enterprise network. For instance, the user can be detected as being on-premises even if the user typically works out of a main campus of an enterprise but on a particular day visits a remote branch office of the enterprise or vice versa. As another example, the user can be on-premises even if the user is located in a first WLAN and the first VoIP-enabled client device is located in a second WLAN remote to the first WLAN (e.g., in a different building or different floors of the same building) or a second WLAN local to the first WLAN (e.g., on the same floor).

If the user is determined to be on-premises, the process 600 can proceed to step 608 in which it can be determined whether the user is proximate to the first VoIP-enabled client device or within a proximal threshold of the first VoIP-enabled client device. In an example embodiment, the proximal threshold can be specified by the user. In another example embodiment, the proximal threshold can be a value or function applicable to every user, such as within a 5-foot, 10-foot, 15-foot radius or other range relative to the first VoIP-enabled client device. It should also be appreciated that the proximal threshold may not be static but can be dynamically based on whether the user is moving toward the first VoIP-enabled client device or moving away from the device. The proximal threshold can also be dynamically determined based on factors such as the types or characteristics of the APs (e.g., AP 126 of FIG. 1), beacons (e.g., beacons 356 of FIG. 3B), and/or other devices making up the WLAN in which the user is located; a confidence level associated with the determined location of the user; environmental factors, such as physical obstacles or interference from other electronic devices in the area; or other suitable factor known to one of ordinary skill in the art.

If the user is determined to be within the proximal threshold of the first VoIP-enabled client device, the process 600 can continue to step 606 upon which the call control and routing platform, network management system, network controller, or similar system can invoke the default call routing rule sending the call to the user's first VoIP-enabled client device and the process 600 can conclude. On the other hand, if the user is determined not to be proximate to the first VoIP-enabled client device, the process 600 can continue to step 610 at which it is determined whether a second is proximate to the user or a proximity of the second user relative to the user is within a second proximal threshold. If another person is proximate to the user or within the second proximal threshold, the process 600 can continue to step 612 at which point a volume of a second VoIP-enabled device associated with the user can be adjusted. The process 600 can proceed to step 614 thereafter in which the call can be routed to the second VoIP-enabled client device and conclude. It will be appreciated that the second proximal threshold can be configurable and/or statically or dynamically defined based on the proximal threshold factors discussed with respect to step 608. If no other user is determined to be within the second proximal threshold of the user, the process 600 can proceed directly to step 614 in which the call may be routed to the second VoIP-enabled client device and conclude. In some example embodiments, the second VoIP-enabled client device can be determined based on the device being most proximate to the user relative to other VoIP-enabled devices associated with the user.

In some example embodiments, the user can make outbound calls originating from the enterprise network from any VoIP-enabled client device. In an example embodiment, the user can also make emergency phone calls that originate from the enterprise network from any of the user's VoIP-enabled client devices, including mobile devices such as laptops, tablets, smartphones, wearable devices, etc. For instance, one or more portions of a WLAN can each be associated with an emergency location identification number (ELIN). Each ELIN and its corresponding location information can be translated for entry into an Automatic Location Identifier (ALI) database utilized by a public-safety answering point (PSAP) local to the WLAN. After this preliminary configuration, the call and routing platform, network management system, network controller, or similar system can receive an emergency call, originating from enterprise infrastructure, from one of the user's mobile VoIP-enabled client devices. The enterprise network can obtain the location of the user's mobile VoIP-enabled client device, such as by making a request to a network controller (e.g., network controller 210 of FIG. 2) or other location determination system. The determined location can be mapped to the corresponding ELIN and PSAP. The emergency call can be routed to the corresponding PSAP with the ELIN being used as the Automatic Identification Number (AIN). The PSAP can search the ALI database to obtain the location information corresponding to the ELIN, and direct emergency response personnel to the correct address, building, floor, room, cubicle, etc. for responding to the emergency call.

Figure 7:
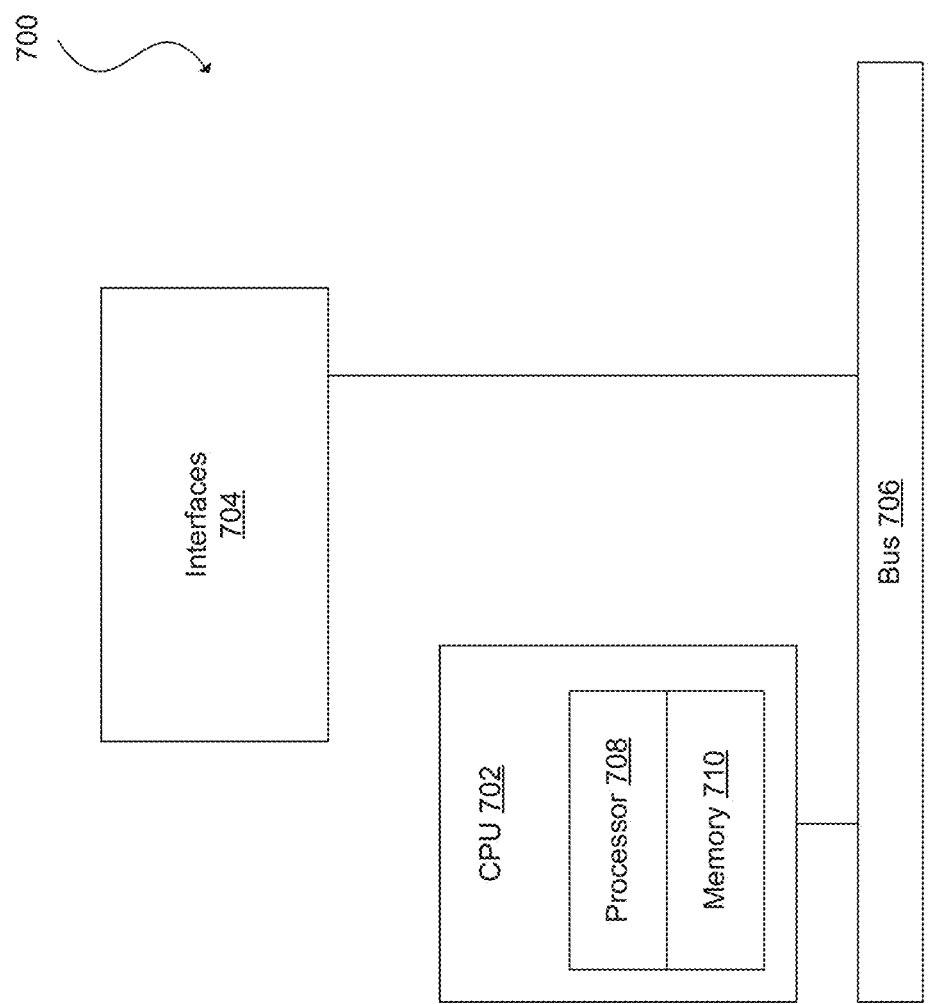
FIG. 7 illustrates an example network device that can be utilized in an example embodiment.

FIG. 7 illustrates an example network device 700 that can be utilized in an example embodiment. The network device 700 can include a master central processing unit (CPU) 702, interfaces 704, and a bus 706 (e.g., a PCI bus). When acting under the control of appropriate software or firmware, the CPU 702 can be responsible for executing packet management, error detection, and/or routing functions. The CPU 702 preferably accomplishes all these functions under the control of software including an operating system and any appropriate applications software. The CPU 702 may include one or more processors 708 such as a processor from the Motorola family of microprocessors or the MIPS family of microprocessors. In an alternative embodiment, processor 708 can be specially designed hardware for controlling the operations of network device 700. In a specific embodiment, a memory 710 (such as non-volatile RAM and/or ROM) can also form part of the CPU 702. However, there are many different ways in which memory could be coupled to the system.

The interfaces 704 can be provided as interface cards (sometimes referred to as line cards). The interfaces 704 can control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. The interfaces 704 may include ports appropriate for communication with the appropriate media. In some cases, the interfaces 704 may also include an independent processor and, in some instances, volatile RAM. The independent processors may control such communications intensive tasks as packet switching, media control and management. By providing separate processors for the communications intensive tasks, the interfaces 704 may allow the CPU 702 to efficiently perform routing computations, network diagnostics, security functions, etc.

Although the system shown in FIG. 7 is one specific network device of an example embodiment, it is by no means the only network device architecture on which the subject technology can be implemented. For example, an architecture having a single processor that can handle communications as well as routing computations, etc., can also be used. Further, other types of interfaces and media could also be used with the network device 700.

Regardless of the network device's configuration, it may employ one or more memories or memory modules (including memory 710) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 8A:
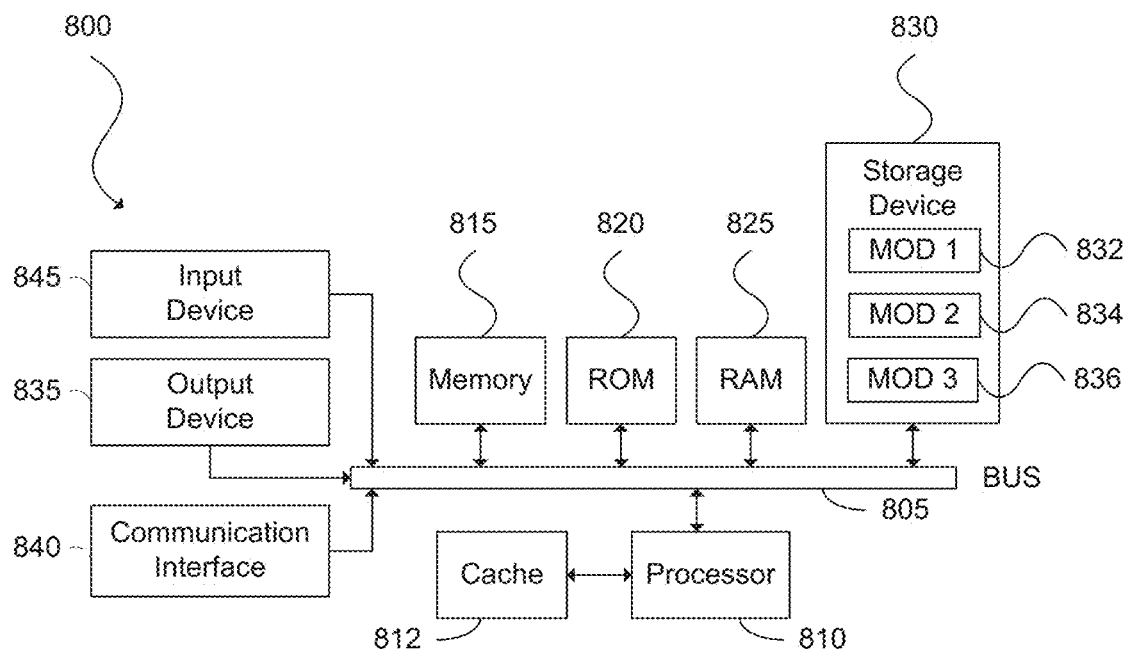
FIGS. 8A and 8B illustrate example systems that can be utilized in example embodiments.
Figure 8B:
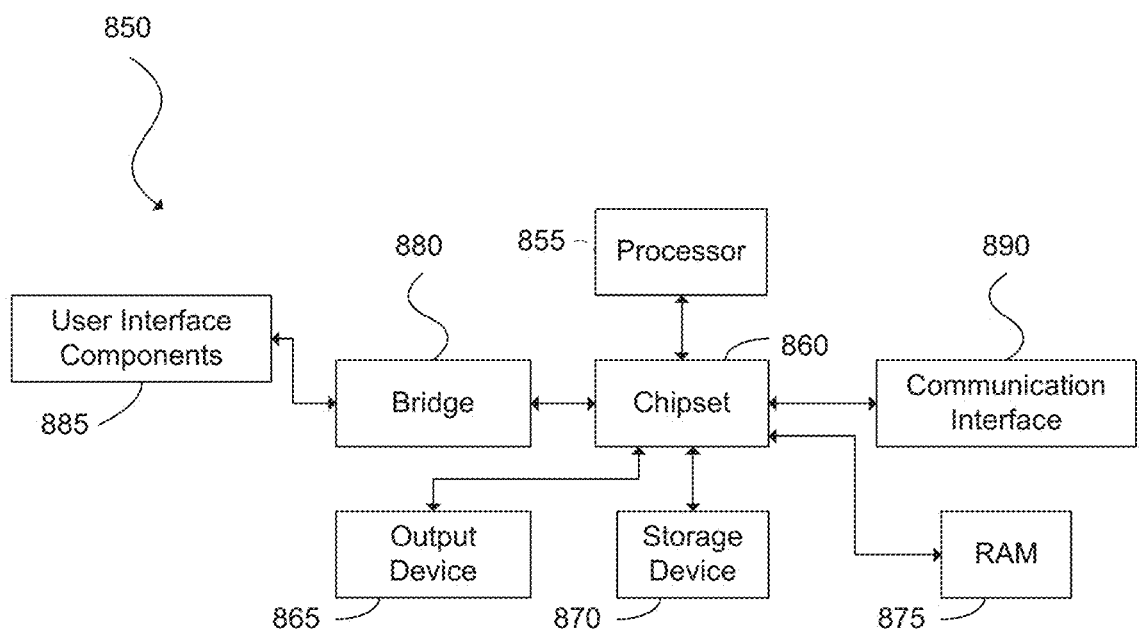

FIG. 8A and FIG. 8B illustrate example systems that can be utilized in example embodiments. The more appropriate embodiment will be apparent to those of ordinary skill in the art when practicing the present technology. Persons of ordinary skill in the art will also readily appreciate that other systems are possible.

FIG. 8A illustrates an example architecture for a conventional bus computing system 800 wherein the components of the system are in electrical communication with each other using a bus 805. The computing system 800 can include a processing unit (CPU or processor) 810 and a system bus 805 that may couple various system components including the system memory 815, such as read only memory (ROM) in a storage device 870 and random access memory (RAM) 875, to the processor 810. The computing system 800 can include a cache 812 of high-speed memory connected directly with, in close proximity to, or integrated as part of the processor 810. The computing system 800 can copy data from the memory 815 and/or the storage device 830 to the cache 812 for quick access by the processor 810. In this way, the cache 812 can provide a performance boost that avoids processor delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing system 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing system 800. The communications interface 840 can govern and manage the user input and system output. There may be no restriction on operating on any particular hardware arrangement and therefore the basic features here may easily be substituted for improved hardware or firmware arrangements as they are developed.

Storage device 830 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include software modules 832, 834, 836 for controlling the processor 810. Other hardware or software modules are contemplated. The storage device 830 can be connected to the system bus 805. In one aspect, a hardware module that performs a particular function can include the software component stored in a computer-readable medium in connection with the necessary hardware components, such as the processor 810, bus 805, output device 835, and so forth, to carry out the function.

FIG. 8B illustrates an example architecture for a conventional chipset computing system 850 that can be used in accordance with an example embodiment. The computing system 850 can include a processor 855, representative of any number of physically and/or logically distinct resources capable of executing software, firmware, and hardware configured to perform identified computations. The processor 855 can communicate with a chipset 860 that can control input to and output from the processor 855. In this example, the chipset 860 can output information to an output device 865, such as a display, and can read and write information to storage device 870, which can include magnetic media, and solid state media, for example. The chipset 860 can also read data from and write data to RAM 875. A bridge 880 for interfacing with a variety of user interface components 885 can be provided for interfacing with the chipset 860. The user interface components 885 can include a keyboard, a microphone, touch detection and processing circuitry, a pointing device, such as a mouse, and so on. Inputs to the computing system 850 can come from any of a variety of sources, machine generated and/or human generated.

The chipset 860 can also interface with one or more communication interfaces 890 that can have different physical interfaces. The communication interfaces 890 can include interfaces for wired and wireless LANs, for broadband wireless networks, as well as personal area networks. Some applications of the methods for generating, displaying, and using the GUI disclosed herein can include receiving ordered datasets over the physical interface or be generated by the machine itself by processor 855 analyzing data stored in the storage device 870 or the RAM 875. Further, the computing system 800 can receive inputs from a user via the user interface components 885 and execute appropriate functions, such as browsing functions by interpreting these inputs using the processor 855.

It can be appreciated that computing systems 800 and 850 can have more than one processor 810 and 855, respectively, or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
receiving a communication to be routed to a first device;
determining a user is on-premises when the first device is located within one or more access points or beacons of a wireless network, wherein the wireless network comprises a plurality of access points or beacons and the first device is a portable device; and
in response to determining that the user is on-premises, that the first device exceeds a proximal threshold, and that a second device is within the proximal threshold, wherein the proximal threshold is determined at least in part on a type or characteristic of the one or more access points or beacons of the wireless network, sending the communication to the second device.

2. The computer-implemented method of claim 1, further comprising:
adjusting a volume of the second device.

3. The computer-implemented method of claim 2, wherein,
the adjusting the volume includes turning down a ringer volume of the second device.

4. The computer-implemented method of claim 2, further comprising:
wherein,
the adjusting the volume includes muting a ringer volume of the second device.

5. The computer-implemented method of claim 1, further comprising:
receiving a second communication associated with a phone number for the second device.

6. The computer-implemented method of claim 5, further comprising:
determining the second device exceeds a proximal threshold.

7. The computer-implemented method of claim 6, further comprising:
sending the second communication to the first device.

8. The computer-implemented method of claim 1,
wherein,
the communication is associated with a phone number for the first device.

9. A non-transitory computer-readable storage medium having stored therein instructions that, upon being executed by a processor, cause the processor to:
receive a communication to be routed to a first device associated with a user;
determine the user is on-premises when the first device is located within one or more access points or beacons of a wireless network, wherein the wireless network comprises a plurality of access points or beacons and the first device is a portable device; and
in response to determining the user is on-premise, that the first device exceeds a proximal threshold, and that a second device is within the proximal threshold, wherein the proximal threshold is determined at least in part on a type or characteristic of the one or more access points or beacons of the wireless network, send the communication to the second device.

10. The non-transitory computer-readable storage medium of claim 9, wherein the instructions further cause the processor to:
determine that another user is proximate to the user; and
adjust a volume of the second device in response to the another user being proximate to the user by turning down a ringer volume of the second device.

11. The non-transitory computer-readable storage medium of claim 9, wherein the instructions further cause the processor to:
determine that another user is proximate to the user; and
adjust a volume of the second device in response to the another user being proximate to the user by muting a ringer volume of the second device.

12. The non-transitory computer-readable storage medium of claim 9, wherein the communication is associated with a phone number for the first device.

13. The non-transitory computer-readable storage medium of claim 9, wherein the instructions further cause the processor to:
receive a second communication for the user.

14. The non-transitory computer-readable storage medium of claim 13, wherein the instructions further cause the processor to:
determine the second device does not exceed the proximal threshold.

15. The non-transitory computer-readable storage medium of claim 14, wherein the instructions further cause the processor to:
send the second communication to the second device.

16. A system comprising:
one or more processors; and
memory including instructions that, upon being executed by the one or more processors, cause the system to:
receive a communication for a user;
determine the user is on-premises when a first device is located within one or more access points or beacons of a wireless network, wherein the wireless network comprises a plurality of access points or beacons and the first device is a portable device; and
in response to determining the user is on-premise, that the first device exceeds a proximal threshold, and that a second device is within the proximal threshold, wherein the proximal threshold is determined based on at least in part on a type or characteristic of the one or more access points or beacons of the wireless network, send the communication to the second device.

17. The system of claim 16, wherein the operations further comprise:
determining that a current number of users proximate to the first device exceeds a previous number of users proximate to the first device; and
adjusting a volume of the first device in response to determining that the current number of users proximate to the first device exceeds the previous number of users proximate to the first device.

18. The system of claim 17,
wherein,
the adjusting of the volume includes turning down a ringer volume of the first device.

19. The system of claim 16, wherein the communication is associated with a network address for the first device.

20. The system of claim 16, wherein the communication is associated with a phone number of the first device.

* * * * *